US012781025B2

(12) United States Patent
Dhavale et al.

(10) Patent No.: US 12,781,025 B2
(45) Date of Patent: Nov. 3, 2026

(54) METHODS OF PREPARING A COMPOSITE HAVING ELASTOMER, FILLER, AND LINKING AGENTS

(71) Applicant: Beyond Lotus LLC, Wilmington, DE (US)

(72) Inventors: Prachi A. Dhavale, Freemont, CA (US); Michael D. Morris, Nashua, NH (US); Paul S. Palumbo, West Newton, MA (US); Michael Beaulieu, Bolton, MA (US)

(73) Assignee: Beyond Lotus LLC, Wilmington, DE (US)

( * ) Notice: Subject to any disclaimer, the term of this patent is extended or adjusted under 35 U.S.C. 154(b) by 660 days.

(21) Appl. No.: 18/256,269

(22) PCT Filed: Dec. 8, 2021

(86) PCT No.: PCT/US2021/062433
§ 371 (c)(1),
(2) Date: Jun. 7, 2023

(87) PCT Pub. No.: WO2022/125679
PCT Pub. Date: Jun. 16, 2022

(65) Prior Publication Data

US 2024/0026128 A1 Jan. 25, 2024

Related U.S. Application Data

(60) Provisional application No. 63/123,386, filed on Dec. 9, 2020, provisional application No. 63/123,391, filed on Dec. 9, 2020.

(51) Int. Cl.

| | |
|---|---|
| ***C08K 13/02*** | (2006.01) |
| ***C08J 3/205*** | (2006.01) |
| ***C08J 3/24*** | (2006.01) |
| ***C08K 3/04*** | (2006.01) |
| ***C08K 3/36*** | (2006.01) |
| ***C08K 5/18*** | (2006.01) |
| ***C08K 5/42*** | (2006.01) |

(52) U.S. Cl.
CPC ............. *C08K 13/02* (2013.01); *C08J 3/2053* (2013.01); *C08J 3/24* (2013.01); *C08K 5/42* (2013.01); *C08J 2307/00* (2013.01); *C08K 3/04* (2013.01); *C08K 3/36* (2013.01); *C08K 5/18* (2013.01)

(58) Field of Classification Search
CPC ............ C08K 13/02; C08K 5/42; C08K 3/04; C08K 3/36; C08K 5/18; C08J 3/2053; C08J 3/24; C08J 2307/00
See application file for complete search history.

(56) References Cited

U.S. PATENT DOCUMENTS

| | | | |
|---|---|---|---|
| 2,820,836 | A | 1/1958 | Smith |
| 3,294,720 | A | 12/1966 | Beber et al. |
| 4,073,840 | A | 2/1978 | Saidla |
| 5,108,188 | A | 4/1992 | Peter et al. |
| 5,183,640 | A | 2/1993 | Peter et al. |
| 5,251,977 | A | 10/1993 | Peter et al. |
| 5,368,383 | A | 11/1994 | Peter et al. |
| 5,599,868 | A | 2/1997 | Bohm et al. |
| 5,633,296 | A | 5/1997 | Peter |
| 5,990,211 | A | 11/1999 | Yano |
| 6,068,922 | A | 5/2000 | Vercesi et al. |
| 6,075,084 | A | 6/2000 | Mabry et al. |
| 6,136,913 | A | 10/2000 | Nahmias et al. |
| 6,372,822 | B1 | 4/2002 | Chung et al. |
| 6,646,028 | B2 | 11/2003 | Lopez-Serrano Ramos et al. |
| 6,828,361 | B2 | 12/2004 | Peter et al. |
| 6,902,312 | B2 | 6/2005 | Peter |
| 9,018,297 | B2 | 4/2015 | Miyazaki et al. |
| 9,023,928 | B2 | 5/2015 | Miyazaki et al. |
| 9,068,055 | B2 | 6/2015 | Watanabe |
| 9,074,063 | B2 | 7/2015 | Nakamura et al. |
| 9,115,258 | B2 | 8/2015 | De Gaudemaris et al. |
| 9,365,497 | B2 | 6/2016 | Watanabe et al. |
| 9,701,161 | B2 | 7/2017 | Bondu et al. |
| 9,713,942 | B2 | 7/2017 | Bondu et al. |

(Continued)

FOREIGN PATENT DOCUMENTS

| | | | |
|---|---|---|---|
| CN | 101214706 | A | 7/2008 |
| CN | 101851360 | A | 10/2010 |

(Continued)

OTHER PUBLICATIONS

Kim, Kwang-Jea, et al., "Moisture Effects on Improved Hydrolysis Reaction for TESPT and TESPD-Silica Compounds", Composite Interfaces, 11:7, pp. 471-488 (2004).
Kim, Kwang-Jea, et al., "Moisture Effects on TESPD-Silica/CB/SBR Compounds", Spring Rubber Division, ACS, Meeting (San Franscisco), Apr. 28-30, 2003, revised January 2005, pp. 84-104.
Kim, Kwang-Jea, et al., "Temperature Effects of Silane Coupling on Moisture Treated Silica Surface", Journal of Applied Polymer Science, vol. 95, pp. 623-633 (2005).
Wang, M.J., et al., "NR/Carbon Black Masterbatch Produced with Continuous Liquid Phase Mixing", KGK Kautschuk Gummi Kunststoffe 55. Jahrgang, Nr. 7-8/2022, pp. 388-396.

(Continued)

*Primary Examiner* — Patrick D Niland

(57) ABSTRACT

Disclosed herein are methods of mixing at least a solid elastomer, a wet filler comprising carbon black and a liquid present in an amount of at least 20% by weight based on total weight of wet filler, and a linking agent. In one or more mixing steps, the method further comprises mixing the at least the solid elastomer, the wet filler, and the linking agent to form a mixture, and removing at least a portion of the liquid from the mixture by evaporation. The method further comprises discharging, from the mixer, the composite comprising the filler dispersed in the elastomer at a loading of at least 20 phr. Also disclosed are composites, vulcanizates, and articles formed therefrom.

34 Claims, No Drawings

(56) References Cited

U.S. PATENT DOCUMENTS

| | | | |
|---|---|---|---|
| 9,714,325 | B2 | 7/2017 | Miyasaka |
| 9,758,627 | B2 | 9/2017 | Wang et al. |
| 9,834,658 | B2 | 12/2017 | Yanagi |
| 10,017,612 | B2 | 7/2018 | Tanaka et al. |
| 10,023,723 | B2 | 7/2018 | Jiang et al. |
| 10,053,553 | B2 | 8/2018 | Yukimura et al. |
| 10,179,843 | B2 | 1/2019 | Mukai |
| 10,179,848 | B2 | 1/2019 | Komiya |
| 10,208,137 | B2 | 2/2019 | Komiya |
| 10,308,073 | B2 | 6/2019 | Gervais et al. |
| 10,343,455 | B2 | 7/2019 | Dogomori et al. |
| 10,414,906 | B2 | 9/2019 | Kitago et al. |
| 10,577,486 | B2 | 3/2020 | Miyasaka |
| 10,793,702 | B2 | 10/2020 | Koyama |
| 10,889,658 | B2 | 1/2021 | Miyasaka |
| 10,913,838 | B2 | 2/2021 | Kurihara |
| 12,247,114 | B1 * | 3/2025 | Kutsovsky ................ B29B 7/90 |
| 2005/0080179 | A1 | 4/2005 | Kim et al. |
| 2005/0239946 | A1 | 10/2005 | Lin et al. |
| 2011/0021664 | A1 | 1/2011 | Wang et al. |
| 2011/0265923 | A1 | 11/2011 | Arnold et al. |
| 2012/0152540 | A1 * | 6/2012 | Patil .................. C04B 22/00863 166/293 |
| 2012/0172517 | A1 | 7/2012 | Zhang et al. |
| 2012/0277359 | A1 | 11/2012 | Thuilliez et al. |
| 2013/0231417 | A1 | 9/2013 | Vasseur et al. |
| 2018/0105612 | A1 | 4/2018 | MIyasaka |
| 2018/0105654 | A1 | 4/2018 | Koyama |
| 2018/0105675 | A1 | 4/2018 | Miyasaka |
| 2018/0105682 | A1 | 4/2018 | Miura |
| 2018/0282523 | A1 | 10/2018 | Sandstrom |
| 2018/0371181 | A1 | 12/2018 | Ghosal et al. |
| 2019/0002702 | A1 | 1/2019 | Herd et al. |
| 2019/0144634 | A1 | 5/2019 | Mukai |
| 2019/0144640 | A1 | 5/2019 | Koyama |
| 2019/0144680 | A1 | 5/2019 | Mukai |
| 2019/0177513 | A1 | 6/2019 | Hamatani et al. |
| 2019/0211190 | A1 | 7/2019 | Kurihara |
| 2019/0218350 | A1 | 7/2019 | Tanaka |
| 2019/0233621 | A1 | 8/2019 | Takahashi |
| 2019/0241723 | A1 | 8/2019 | Takahashi |
| 2020/0079933 | A1 | 3/2020 | Saiki et al. |
| 2020/0140663 | A1 | 5/2020 | Minouchi |
| 2020/0189318 | A1 | 6/2020 | Calzetta et al. |
| 2020/0231782 | A1 | 7/2020 | Sato et al. |
| 2020/0317823 | A1 | 10/2020 | Dussillols et al. |

FOREIGN PATENT DOCUMENTS

| | | | |
|---|---|---|---|
| CN | 106674631 | A | 5/2017 |
| CN | 107457933 | A | 12/2017 |
| DE | 10149163 | A1 | 4/2003 |
| DE | 102017212387 | A1 | 1/2019 |
| DE | 102017223554 | A1 | 6/2019 |
| EP | 1110691 | A2 | 6/2001 |
| EP | 1191058 | A1 | 3/2002 |
| EP | 1425338 | B1 | 8/2011 |
| EP | 2410003 | B1 | 4/2014 |
| EP | 3450201 | A1 | 3/2019 |
| EP | 3494173 | B1 | 6/2021 |
| EP | 3845591 | A1 | 7/2021 |
| GB | 770773 | | 3/1957 |
| GB | 940632 | | 10/1963 |
| GB | 981836 | | 1/1965 |
| JP | 4278765 | B2 | 6/2009 |
| JP | 2012/062393 | A | 3/2012 |
| JP | 2013/018315 | A | 1/2013 |
| JP | 2013/107991 | A | 6/2013 |
| JP | 2014/227540 | A | 12/2014 |
| JP | 2014/227542 | | 12/2014 |
| JP | 2017/008244 | | 1/2017 |
| WO | WO 2010/000299 | A1 | 1/2010 |
| WO | WO 2015/067970 | A1 | 5/2015 |
| WO | WO 2017/001570 | A1 | 1/2017 |
| WO | WO 2017/008244 | A1 | 1/2017 |
| WO | WO 2018/219630 | A1 | 12/2018 |
| WO | WO 2018/219631 | A1 | 12/2018 |
| WO | WO 2019/133442 | A1 | 7/2019 |
| WO | WO 2020/001823 | A1 | 1/2020 |
| WO | WO 2020/0145089 | A1 | 7/2020 |
| WO | WO 2021/001156 | A1 | 1/2021 |

OTHER PUBLICATIONS

Uekita, Y., et al, "Performance Improvement of Natural Rubber/Carbon Black Composites by Novel Coupling Agents", Sumitomo Chemical Co., Ltd., Energy & Functional Materials Research Laboratory, translation from R&D Report, Sumitomo Kagaku, vol. 2016, pp. 1-9.

The International Search Report and the Written Opinion of International Patent Application No. PCT/US2021/062433, mailed Mar. 9, 2022.

* cited by examiner

METHODS OF PREPARING A COMPOSITE HAVING ELASTOMER, FILLER, AND LINKING AGENTS

FIELD OF THE INVENTION

Disclosed herein are methods of preparing composite by combining solid elastomer, wet filler, and a linking agent. Also disclosed are composites made by the present methods and corresponding vulcanizates derived from these composites.

BACKGROUND

There is always a desire in the rubber industry to develop methods to disperse filler in elastomer and it is especially desirable to develop methods which can do so efficiently with respect to filler dispersion quality, time, effort, and/or cost.

Numerous products of commercial significance are formed of elastomeric compositions wherein reinforcing filler is dispersed in any of various synthetic elastomers, natural rubber or elastomer blends. Carbon black and silica, for example, are widely used to reinforce natural rubber and other elastomers. It is common to produce a masterbatch, that is, a premixture of reinforcing filler, elastomer, and various optional additives, such as extender oil. Such masterbatches are then compounded with processing and curing additives and upon curing, generate numerous products of commercial significance. Such products include, for example, pneumatic and non-pneumatic or solid tires for vehicles, including the tread portion including cap and base, undertread, innerliner, sidewall, wire skim, carcass and others. Other products include, for example, engine mounts, bushings, conveyor belts, windshield wipers, rubber components for aerospace and marine equipment, vehicle track elements, seals, liners, gaskets, wheels, bumpers, anti-vibration systems and the like.

While there are a number of methods to incorporate filler into solid elastomer, there is a continuing need for new methods to achieve acceptable or enhanced elastomer composite dispersion quality and functionality from elastomer composite masterbatches, which can translate into acceptable or enhanced properties in the corresponding vulcanized rubber compounds and rubber articles.

SUMMARY

One aspect is a method of preparing a composite, comprising:

(a) charging a mixer with at least a solid elastomer, a wet filler comprising carbon black and a liquid present in an amount of at least 20% by weight based on total weight of wet filler, and a linking agent;

(b) in one or more mixing steps, mixing the at least the solid elastomer, the wet filler, and the linking agent to form a mixture, and removing at least a portion of the liquid from the mixture by evaporation; and (c) discharging, from the mixer, the composite comprising the filler dispersed in the elastomer at a loading of at least 20 phr, wherein the composite has a liquid content of no more than 10% by weight based on total weight of said composite, wherein the linking agent is selected from compounds having at least two functional groups, wherein:

a first functional group is selected from —$N(R^1)(R^2)$, —$N(R^1)(R^2)(R^3)^+A^-$, —S—$SO_3M^1$, and structures represented by formula (I) and formula (II), (I)

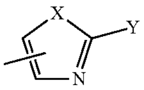

(II)

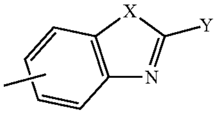

wherein $A^-$ is chloride, bromide, iodide, hydroxyl, nitrate or acetate, X═NH, O, or S, Y═H, $OR^4$, $NR^4R^5$, —$S_nR^4$, and n is an integer selected from 1-6, and a second functional group is selected from thiocarbonyl, nitrile oxide, nitrone, nitrile imine, —S—$SO_3M^2$, —$S_x$—$R^6$, —SH, —$C(R^6)$═$C(R^7)$—$C(O)R^8$, —$C(R^6)$═$C(R^7)$—$CO_2R^8$, —$C(R^6)$═$C(R^7)$—$CO_2M^2$, and $R^1$-$R^8$ are each independently selected from H and $C_1$-$C_8$ alkyl; $M^1$ and $M^2$ are each independently selected from H, $Na^+$, $K^+$, $Li^+$, $N(R')_4^+$ wherein each R' is independently selected from H and $C_1$-$C_{20}$ alkyl, and x is an integer selected from 1-8.

Another aspect is a method of preparing a composite, comprising:

(a) charging a first mixer with at least a solid elastomer and a wet filler comprising carbon black and a liquid present in an amount of at least 20% by weight based on total weight of wet filler;

(b) in one or more mixing steps, mixing the at least the solid elastomer and the wet filler to form a mixture, and removing at least a portion of the liquid from the mixture by evaporation;

(c) discharging, from the first mixer, the mixture comprising the filler dispersed in the elastomer at a loading of at least 20 phr, wherein the mixture has a liquid content that is reduced to an amount less than the liquid content at the beginning of step (b), and wherein the mixture has a material temperature ranging from 100° C. to 180° C.;

(d) mixing the mixture from (c) in a second mixer to obtain the composite; and (e) discharging, from the second mixer, the composite having a liquid content of less than 3% by weight based on total weight of said composite, wherein a linking agent is charged to the first mixer, the second mixer, or both the first and second mixers, the linking agent being selected from compounds having at least two functional groups, wherein a first functional group is selected from —$N(R^1)(R^2)$, —$N(R^1)(R^2)(R^3)^+A^-$, —S—$SO_3M^1$, and structures represented by formula (I) and formula (II), (I)

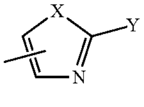

-continued (II)

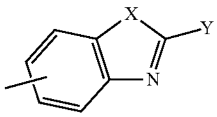

wherein $A^-$ is chloride, bromide, iodide, hydroxyl, nitrate or acetate, X═NH, O, or S, Y═H, $OR^4$, $NR^4R^5$, —$S_nR^4$, and n is an integer selected from 1-6, and a second functional group is selected from thiocarbonyl, nitrile oxide, nitrone, nitrile imine, —S—$SO_3M^2$, —$S_x$—$R^6$, —SH, —C($R^6$)═C($R^7$)—C(O)$R^8$, —C($R^6$)═C($R^7$)—$CO_2R^8$, —C($R^6$)═C($R^7$)—$CO_2M^2$, and $R^1$-$R^8$ are each independently selected from H and $C_1$-$C_8$ alkyl; $M^1$ and $M^2$ are each independently selected from H, $Na^+$, $K^+$, $Li^+$, $N(R')_4^+$ wherein each R' is independently selected from H and $C_1$-$C_{20}$ alkyl, and x is an integer selected from 1-8.

Another aspect is a method of preparing a vulcanizate, comprising curing the composite prepared by any of the methods disclosed herein in the presence of at least one curing agent to form the vulcanizate. Other aspects are composites, vulcanizate and articles formed therefrom.

With regard to any aspect or method or embodiment disclosed herein, where applicable, the method can further comprise any one or more of the following embodiments: the linking agent further comprises at least one spacer between the first and second functional groups, wherein the at least one spacer is selected from —$(CH_2)_n$—, —$(CH_2)_y$C(O)—, —C($R^9$)═C($R^{10}$)—, —C(O)—, —N($R^9$)—, and —$C_6H_4$—, wherein $R^9$ and $R^{10}$ are each independently selected from H and $C_1$-$C_8$ alkyl and y is an integer selected from 1-10; the linking agent is selected from thiourea, cystamine, and compounds of formula (1), formula (2), and formula (3), $$H_2N{-}Ar{-}N(H){-}C(O){-}C(R^6){=}C(R^7){-}CO_2M^2 \quad (1)$$

$$H_2N{-}(CH_2)_n{-}SSO_3M^2 \quad (2)$$

$$M^1O_3S{-}S{-}(CH_2)_n{-}S{-}SO_3M^2, \quad (3)$$

wherein $M^1$ and $M^2$ are each independently selected from H, $Na^+$, and $N(R')_4^+$ and $R^6$ and $R^7$ are independently selected from H and $C_1$-$C_6$ alkyl; the linking agent is selected from compounds of formula (1) and $R^6$ and $R^7$ are each H; the linking agent is sodium (2Z)-4-[(4-aminophenyl)amino]-4-oxo-2-butenoate.

With regard to any aspect or method or embodiment disclosed herein, where applicable, the method can further comprise any one or more of the following embodiments: the charging comprises charging the mixer with separate charges of the linking agent and the wet filler; the charging comprises multiple additions of the solid elastomer, the wet filler, and/or the linking agent; said mixing is performed in one mixing step; said mixing is performed in two or more mixing steps; the mixing in (b) is a second mixing step, wherein a first mixing step comprises mixing at least a portion of the solid elastomer and at least a portion of the wet filler followed by charging the mixer with the linking agent; the charging in (a) comprises charging the mixer with a mixture comprising the linking agent and the wet filler; the charging in (a) comprises charging the mixer with a co-pellet comprising the linking agent and the wet filler; in at least one of the mixing steps, the method comprises conducting said mixing wherein the mixer has at least one temperature-control means that is set to a temperature, $T_z$, of 65° C. or higher; in at least one of the mixing steps, the method comprises conducting said mixing with one or more rotors of the mixer operating at a tip speed of at least 0.6 m/s for at least 50% of mixing time; a resulting total specific energy for the mixing is at least 1,300 kJ/kg composite.

With regard to any aspect or method or embodiment disclosed herein, where applicable, the method can further comprise any one or more of the following embodiments: the wet filler further comprises at least one material selected from carbonaceous materials, silica, nanocellulose, lignin, clays, nanoclays, metal oxides, metal carbonates, pyrolysis carbon, graphenes, graphene oxides, reduced graphene oxide, carbon nanotubes, single-wall carbon nanotubes, multi-wall carbon nanotubes, or combinations thereof, and coated and treated materials thereof; the wet filler further comprises silica; wet filler has a liquid present in an amount ranging from 20% to 80% by weight based on total weight of wet filler; the wet filler is in the form of a powder, paste, pellet, or cake.

With regard to any aspect or method or embodiment disclosed herein, where applicable, the method can further comprise any one or more of the following embodiments: the solid elastomer is selected from natural rubber, functionalized natural rubber, styrene-butadiene rubber, functionalized styrene-butadiene rubber, polybutadiene rubber, functionalized polybutadiene rubber, polyisoprene rubber, ethylene-propylene rubber, isobutylene-based elastomers, polychloroprene rubber, nitrile rubber, hydrogenated nitrile rubber, polysulfide rubber, polyacrylate elastomers, fluoroelastomers, perfluoroelastomers, silicone elastomers, and blends thereof; the solid elastomer is selected from natural rubber, functionalized natural rubber, styrene-butadiene rubber, functionalized styrene-butadiene rubber, polybutadiene rubber, functionalized polybutadiene rubber, and blends thereof.

With regard to any aspect or method or embodiment disclosed herein, where applicable, the method can further comprise any one or more of the following embodiments: the one or more mixing steps is a continuous process; the one or more mixing steps is a batch process.

With regard to any aspect or method or embodiment disclosed herein, where applicable, the method can further comprise any one or more of the following embodiments: the method further comprising aging the composite to form an aged composite; the composite was aged for at least 5 days at a temperature of at least 20° C.; the composite was aged for at least 1 day at a temperature of at least 40° C.; a vulcanizate prepared from the aged composite has a maximum tan δ is that is increased by no more than 10% the value of a vulcanizate prepared from a composite that was not aged; a vulcanizate prepared from the aged composite has a Payne effect is that is increased by no more than 10% the value of a vulcanizate prepared from a composite that was not aged.

DETAILED DESCRIPTION

Disclosed herein, in part, are methods of preparing or forming a composite by mixing a solid elastomer with a wet filler. Also disclosed herein, in part, are composites, vulcanizates, and articles formed therefrom.

When mixing fillers with elastomers, a challenge is to ensure the mixing time is long enough to ensure sufficient filler incorporation and dispersion before the elastomer in the mixture experiences high temperatures and undergoes degradation. In typical dry mix methods, the mix time and temperature are controlled to avoid such degradation and the ability to optimize filler incorporation and dispersion is often not possible.

PCT Publ. No. WO 2020/247663, the disclosure of which is incorporated by reference herein, describes mixing processes with solid elastomer and a wet filler (e.g., comprising a filler and a liquid) to enable the batch time and temperature to be controlled beyond that attainable with known dry mixing processes. Other benefits may be attained, such as enhancing filler dispersion and/or facilitating rubber-filler interactions and/or improving rubber compound properties compared to conventionally mixed masterbatches when they are compounded and vulcanized. At least one of two properties can be improved, e.g., the ratio of tensile stress at 300% elongation to stress at 100% elongation (M300/M100), and the tangent delta (tan δ) measured at 60° C. A higher M300/M100 value is thought to be related to improved tire wear resistance and a lower tan δ value is thought to be related to improved energy efficiency of tires.

Disclosed herein are methods that incorporate the use of a wet filler in a mixing process with solid elastomer and further incorporates a linking agent. The composite formed by the methods disclosed herein can be considered an uncured mixture of filler(s), and elastomer(s). The composite formed can be considered a mixture or masterbatch. The composite formed can be, as an option, an intermediate product that can be used in subsequent rubber compounding and one or more vulcanization processes. The composite, prior to the compounding and vulcanization, can also be subjected to additional processes, such as one or more holding steps or further mixing step(s), one or more additional drying steps, one or more extruding steps, one or more calendering steps, one or more milling steps, one or more granulating steps, one or more baling steps, one or more twin-screw discharge extruding steps, or one or more rubber working steps to obtain a rubber compound or a rubber article.

In one aspect, disclosed herein is a method of preparing a composite, comprising:

(a) charging a mixer with at least a solid elastomer, a wet filler comprising carbon black and a liquid present in an amount of at least 20% by weight based on total weight of wet filler, and a linking agent;

(b) in one or more mixing steps, mixing the at least the solid elastomer, the wet filler, and the linking agent to form a mixture, and removing at least a portion of the liquid from the mixture by evaporation; and (c) discharging, from the mixer, the composite comprising the filler dispersed in the elastomer at a loading of at least 20 phr, wherein the composite has a liquid content of no more than 10% by weight based on total weight of said composite, wherein the linking agent is selected from compounds having at least two functional groups, wherein:

a first functional group is selected from $-NR^1R^2$, $-N(R^1)(R^2)(R^3)^+A^-$, $-S-SO_3M^1$, and structures represented by formula (I) and formula (II), (I)

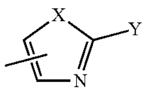

-continued (II)

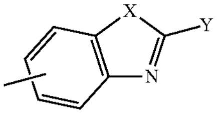

wherein $A^-$ is chloride, bromide, iodide, hydroxyl, nitrate or acetate, X=NH, O, or S, Y=H, $OR^4$, $NR^4R^5$, $-S_nR^4$, and n is an integer selected from 1-6, and a second functional group is selected from thiocarbonyl, nitrile oxide, nitrone, nitrile imine, $-S-SO_3M^2$, $-S_x-R^6$, $-SH$, $-C(R^6)=C(R^7)-C(O)R^8$, $-C(R^6)=C(R^7)-CO_2R^8$, $-C(R^6)=C(R^7)-CO_2M^2$, and $R^1$-$R^8$ are each independently selected from H and $C_1$-$C_8$ alkyl; $M^1$ and $M^2$ are each independently selected from H, $Na^+$, $K^+$, $Li^+$, $N(R')_4^+$ wherein each R' is independently selected from H and $C_1$-$C_{20}$ alkyl, and x is an integer selected from 1-8.

Without wishing to be bound by any theory, it is believed that while the mixing process with wet filler can enhance filler dispersion, the linking agent can interact with the filler and/or elastomer to create a stronger interaction between filler and elastomer. As an option, the linking agent can have at least two functional groups, in which the first and second functional groups can interact with the elastomer and/or the filler. The interaction can involve adsorption or a chemical bond, e.g., through ionic interactions, dipole-dipole interactions, hydrogen bonding, covalent bonds, etc. In the composite, the linking agent can be present in the same form as charged to the mixer or in a different form, e.g., if interacting with the filler and/or elastomer via a chemical bond.

The linking agent comprising at least two functional groups can comprise two, three, or four or more functional groups. In any of these embodiments, the linking agent comprises a first functional group that can be selected from $-NR^1R^2$, $-N(R^1)(R^2)(R^3)^+A^-$, $-S-SO_3M^1$, and structures represented by formula (I) and formula (II), (I)

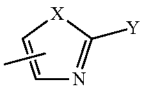

(II)

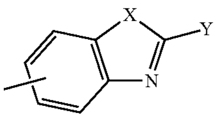

wherein $A^-$ is chloride, bromide, iodide, hydroxyl, nitrate or acetate, X=NH, O, or S, Y=H, $OR^4$, $NR^4R^5$, or $S_nR^4$, and n is an integer selected from 1-6. In certain aspects, the first functional group can be selected from $-NR^1R^2$ (e.g., $-NHR^1$ or $-NH_2$), $-CO_2M^1$, and $-S-SO_3M^1$.

The linking agent can further include a second functional group, which can be selected from thiocarbonyl, nitrile oxide, nitrone, nitrile imine, $-S-SO_3M^2$, $-S_x-R^6$, $-SH$, $-C(R^6)=C(R^7)-C(O)R^8$, $-C(R^6)=C(R^7)-CO_2R^8$, $-C(R^6)=C(R^7)-CO_2M^2$. In certain aspects, the second functional group can be selected from $-S-SO_3M^2$ and $-CR^6=CR^7-CO_2M^2$. Where the functional group is $-CO_2M^1$, and $-S-SO_3M^1$, $-S-SO_3M^2$, and $-CR^6=CR^7-CO_2M^2$, these can be selected from acids or salts thereof, e.g., $M^1$ and $M^2$ are each independently selected from H, $Na^+$, $K^+$, $Li^+$, and $N(R')_4^+$ (e.g., ammonium salts where each R' is independently selected from H and $C_1$-$C_{20}$ alkyl, such as $C_1$-$C_{12}$ alkyl or $C_1$-$C_6$ alkyl or $C_1$-$C_4$ alkyl, e.g., monoalkyl, dialkyl, trialkyl or tetralkyl ammonium salts). Where the linking agent contains two or more $M^1$ or two or more $M^2$ groups, each $M^1$ or $M^2$ can be independently selected from H, $Na^+$, $K^+$, $Li^+$, and $N(R')_4^+$.

In the embodiments described herein, $R^1$-$R^8$ are each independently selected from H and $C_1$-$C_8$ alkyl; $M^1$ and $M^2$ are each independently selected from H, $Na^+$, $K^+$, $Li^+$, $N(R')_4^+$; and x is an integer selected from 1-8.

As an option, the first functional group is capable of interacting with carbon black. Carbon black can have one or more types of surface functional groups such as, but not limited to, oxygen-containing groups such as carboxylic acid (and salts thereof), hydroxyls (e.g., phenols), esters or lactones, ketones, aldehydes, anhydrides, and benzoquinones. As another option, the second functional group is capable of interacting with the solid elastomer. Solid elastomers can be natural elastomers, synthetic elastomers, and blends thereof. For example, the solid elastomers can be selected from natural rubber, functionalized natural rubber, styrene-butadiene rubber, functionalized styrene-butadiene rubber, polybutadiene rubber, functionalized polybutadiene rubber, polyisoprene rubber, ethylene-propylene rubber, isobutylene-based elastomers, polychloroprene rubber, nitrile rubber, hydrogenated nitrile rubber, polysulfide rubber, polyacrylate elastomers, fluoroelastomers, perfluoroelastomers, silicone elastomers, and blends thereof. As an option, the solid elastomer can be selected from natural rubber, styrene-butadiene rubber, and polybutadiene rubber. The solid elastomer can have olefin groups and/or may be functionalized with a number of groups.

As an option, the first functional group can be selected from $—NR^1R^2$ (e.g., $—NH_2$) and $—S—SO_3M^1$ and the second functional group can be selected from $—S—SO_3M^2$ and $—CR^3{=}CR^4—CO_2M^2$.

The linking agent can comprise more than two functional groups. With such linking agents, each additional functional group, e.g., a third, fourth, etc. functional group, can be selected from the list of first and second functional groups as disclosed herein. As an option, more than one type of linking agent can be used to prepare a composite.

The linking agent can further comprise at least one spacer between the first and second functional groups. For example, one or more spacers can be bonded to each other and ultimately to the first and second functional groups. As an option, the at least one spacer is selected from $—(CH_2)_n—$, $—(CH_2)_yC(O)—$, $—C(R^9){=}C(R^{10})—$, $—C(O)—$, $—N(R^9)—$, and $—C_6H_4—$, wherein y is an integer selected from 1-10 and $R^9$ and $R^{10}$ are each independently selected from H and $C^1$-$C^6$ alkyl.

Exemplary linking agents are selected from compounds of formula (1), formula (2), and formula (3), $$H_2N—Ar—N(H)—C(O)—C(R^6){=}C(R^7)—CO_2M^2 \quad (1)$$

$$H_2N—(CH_2)_n—SSO_3M^2 \quad (2)$$

$$M^1O_3S—S—(CH_2)_n—S—SO_3M^2. \quad (3)$$

$M^1$ and $M^2$ are as defined herein, $R^6$ and $R^7$ are independently selected from H and $C_1$-$C_8$ alkyl (e.g., independently selected from H and $C_1$-$C_6$ alkyl or independently selected from H and $C_1$-$C_4$ alkyl). As an option, $M^1$ and $M^2$ are each independently selected from H, $Na^+$, and $N(R')_4^+$, e.g., from H and $Na^+$, and $R^6$ and $R^7$ are the same, e.g., $R^6$ and $R^7$ are each H. An example of a linking agent of formula (1) is sodium (2Z)-4-[(4-aminophenyl)amino]-4-oxo-2-butenoate, commercially available as Sumilink® 200 coupling agent and an example of a linking agent of formula (2) is S-(3-aminopropyl)thiosulfuric acid, commercially available as Sumilink® 100 coupling agent (Sumitomo). An example of a linking agent of formula (3) is commercially available as Duralink™ HTS tire additive (Eastman Chemical Co.). Other linking agents include cystamine and thiourea.

One aspect is a method of preparing a composite, comprising:

(a) charging a mixer with at least a solid elastomer, a wet filler comprising carbon black and a liquid present in an amount of at least 20% by weight based on total weight of wet filler, and a linking agent;

(b) in one or more mixing steps, mixing the at least the solid elastomer, the wet filler, and the linking agent to form a mixture, and removing at least a portion of the liquid from the mixture by evaporation; and (c) discharging, from the mixer, the composite comprising the filler dispersed in the elastomer at a loading of at least 20 phr, wherein the composite has a liquid content of no more than 10% by weight based on total weight of said composite, wherein the linking agent is selected from:

(i) dihydrazide compounds as disclosed in U.S. Pat. Publ. No. 2012/0277359A1, the disclosure of which is incorporated by reference herein, including, among others, phthalic acid dihydrazide, isophthalic acid dihydrazide, terephthalic acid dihydrazide, succinic acid dihydrazide, adipic acid dihydrazide, azelaic acid dihydrazide, sebacic acid dihydrazide, and isophthalic dihydrazide, as disclosed in EP0478274, the disclosure of which is incorporated by reference herein; and/or (ii) hydrazide compounds as disclosed in U.S. Pat. Publ. No. 2019/0177513, the disclosure of which is incorporated by reference herein; and/or (iii) tetrazine compounds as disclosed in U.S. Pat. Publ. No. 2020/0231782, the disclosure of which is incorporated by reference herein; and/or (iv) pyrazololone-based compounds as disclosed in PCT Publ. No. WO 2020/045575, the disclosure of which is incorporated by reference herein (e.g., compound 1 and compound 2); and/or (v) Ex. 2,2'-bis(benzimidazolyl-2)ethyl disulfide, as disclosed in U.S. Pat. No. 9,200,145, the disclosure of which is incorporated by reference herein; and/or (vi) N,N'-bis(2-nitropropyl-1,3-diamino-benzene, as disclosed in U.S. Pat. No. 5,213,025, the disclosure of which is incorporated by reference herein; and/or (vii) compounds having a nitroxide radical, e.g., TEMPO (2,2,6,6-tetramethyl-1-piperidinyloxy radical), as disclosed in U.S. Pat. Nos. 6,084,015, 6,194,509, 8,584,725, and U.S. Publ. No. 2009/0292044, the disclosures of which are incorporated by reference herein; and/or (viii) 1,3-bis(citraconimidomethyl)benzene, commercially available as Perkalink® 900 anti-reversion agent (RheinChemie Additives, Germany).

The amount of linking agent charged to the mixer can range from 10 phr or less, e.g., 6 phr or less, 5 phr or less, 4 phr or less, 3 phr or less, or 2 phr or less, e.g., an amount ranging from 0.1 phr to 10 phr, from 0.1 phr to 8 phr, from 0.1 phr to 6 phr, from 0.1 phr to 5 phr, from 0.1 phr to 4 phr, from 0.1 phr to 3 phr, from 0.2 phr to 10 phr, from 0.2 phr to 8 phr, from 0.2 phr to 6 phr, from 0.2 phr to 5 phr, from 0.2 phr to 4 phr, from 0.2 phr to 4 phr, from 0.2 phr to 3 phr, from 0.5 phr to 10 phr, from 0.5 phr to 8 phr, from 0.5 phr to 6 phr, from 0.5 phr to 5 phr, from 0.5 phr to 4 phr, from 0.5 phr to 3 phr, from 1 phr to 10 phr, from 1 phr to 8 phr, from 1 phr to 6 phr, from 1 phr to 5 phr, from 1 phr to 4 phr, or from 1 phr to 3 phr.

The methods for preparing a composite include the step of charging or introducing into a mixer at least a solid elastomer, a wet filler, and a linking agent e.g., a) one or more solid elastomers and b) one or more fillers wherein at least one filler or a portion of at least one filler has been wetted with a liquid prior to mixing with the solid elastomer (wet filler). The combining of the solid elastomer with wet filler and linking agent forms a mixture during the mixing step(s). The method further includes, in one or more mixing steps, conducting said mixing wherein at least a portion of the liquid is removed by evaporation or an evaporation process that occurs during the mixing. The liquid of the wet filler is capable of being removed by evaporation (and at least a portion is capable of being removed under the claimed mixing conditions) and can be a volatile liquid, e.g., volatile at bulk mixture temperatures. For example, a volatile liquid can be distinguished from oils (e.g., extender oils, process oils) which can be present during at least a portion of the mixing as such oils are meant to be present in the composite that is discharged and thus, do not evaporate during a substantial portion of the mixing time.

The filler charged to the mixer comprises a wet filler. In their dry state, fillers may contain no or small amounts of liquid (e.g. water or moisture) adsorbed onto its surfaces. For example, carbon black can have 0 wt. %, or 0.1 wt. % to 1 wt. % or up to 3 wt. % or up to 4 wt. % of liquid and precipitated silica can have a liquid (e.g., water or moisture) content of from 4 wt. % to 7 wt. % liquid, e.g., from 4 wt. % to 6 wt. % liquid. Such fillers are referred to herein as dry or non-wetted fillers. For the present wet fillers, liquid or additional liquid can be added to the filler and is present on a substantial portion or substantially all the surfaces of the filler, which can include inner surfaces or pores accessible to the liquid. Thus, sufficient liquid is provided to wet a substantial portion or substantially all of the surfaces of the filler prior to mixing with solid elastomer. During mixing, at least a portion of the liquid can also be removed by evaporation as the wet filler is being dispersed in the solid elastomer, and the surfaces of the filler can then become available to interact with the solid elastomer. The wet filler can have a liquid content of at least 20% by weight relative to the total weight of the wet filler, e.g., at least 25%, at least 30%, at least 40%, at least 50% by weight, or from 20% to 99%, from 20% to 95%, from 20% to 90%, from 20% to 80%, from 20% to 70%, from 20% to 60%, from 30% to 99%, from 30% to 95%, from 30% to 90%, from 30% to 80%, from 30% to 70%, from 30% to 60%, from 40% to 99%, from 40% to 95%, from 40% to 90%, from 40% to 80%, from 40% to 70%, from 40% to 60%, from 45% to 99%, from 45% to 95%, from 45% to 90%, from 45% to 80%, from 45% to 70%, from 45% to 60%, from 50% to 99%, from 50% to 95%, from 50% to 90%, from 50% to 80%, from 50% to 70%, or from 50% to 60% by weight, relative to the total weight of the wet filler. Liquid content of filler can be expressed as weight percent: 100*[mass of liquid]/[mass of liquid+mass of dry filler]. As another option, the amount of liquid can be determined based on the oil adsorption number (OAN) of the filler, where OAN is determined based on ASTM D2414. OAN is a measure of filler structure and can be used in determining the amount of liquid to wet the filler. For example, a wet filler such as a wet carbon black, wet silica (e.g., precipitated silica), or wet silicon-treated carbon black can have a liquid content determined according to the equation: k*OAN/(100+OAN)*100. In one embodiment, k ranges from 0.3 to 1.1, or from 0.5 to 1.05, or from 0.6 to 1.1, or from 0.7 to 1.1, or from 0.8 to 1.1, or from 0.9 to 1.1, or from 0.6 to 1.0, or from 0.7 to 1.0, or from 0.8 to 1.0, or from 0.8 to 1.05, or from 0.9 to 1.0, or from 0.95 to 1, or from 0.95 to 1.1, or from 1.0 to 1.1. As an option, the wet filler has a liquid content ranging from 20% to 80%, from 30% to 70%, from 30% to 60%, from 40% to 70%, or from 40% to 60%.

As an option, the wet filler has the consistency of a solid. As an option, a dry filler is wetted only to an extent such that the resulting wet filler maintains the form of a powder, particulates, pellet, cake, or paste, or similar consistency and/or has the appearance of a powder, particulates, pellet, cake, or paste. The wet filler does not flow like a liquid (at zero applied stress). As an option, the wet filler can maintain a shape at 25° C. when molded into such a shape, whether it be the individual particles, agglomerates, pellets, cakes, or pastes. The wet filler is not a composite made by a liquid masterbatch process and is not any other pre-blended composite of filler dispersed in a solid elastomer (from elastomer in a liquid state) in which the elastomer is the continuous phase. The wet filler is not a slurry of filler and does not have the consistency of a liquid or slurry.

The liquid used to wet the filler can be, or include, an aqueous liquid, such as, but not limited to, water. The liquid can include at least one other component, such as, but not limited to, a base(s), an acid(s), a salt(s), a solvent(s), a surfactant(s), a coupling agent(s)(e.g., if the filler further comprises silica), and/or a processing aid(s) and/or any combinations thereof. More specific examples of the component are NaOH, KOH, acetic acid, formic acid, citric acid, phosphoric acid, sulfuric acid, or any combinations thereof. For example, the base can be selected from NaOH, KOH, and mixtures thereof, or the acids can be selected from acetic acid, formic acid, citric acid, phosphoric acid, or sulfuric acid, and combinations thereof. The liquid can be or include a solvent(s) that is immiscible with the elastomer used (e.g., alcohols such as ethanol). Alternatively, the liquid consists of from about 80 wt. % to 100 wt. % water or from 90 wt. % to 99 wt. % water based on the total weight of the liquid.

In the methods disclosed herein, at least the solid elastomer, wet filler, and linking agent are charged (e.g. fed, introduced) into the mixer. The charging of the solid elastomer and/or the filler and/or the linking agent can occur in one or multiple steps or additions. The charging can occur in any fashion including, but not limited to, conveying, metering, dumping and/or feeding in a batch, semi-continuous, or continuous flow of the solid elastomer and the wet filler into the mixer. The solid elastomer and wet filler are not introduced as a pre-mixture to the mixer, in which the pre-mixture was prepared by means other than combining solid elastomer and wet filler. The solid elastomer and wet filler can be added together but not as a mixture prepared by means other than combining solid elastomer and wet filler (e.g., not where the wet filler is pre-dispersed into the elastomer by means other than combining solid elastomer and wet filler, in which the elastomer is the continuous phase). A mixture or pre-mixture or pre-blend from solid elastomer, wet filler, and linking agent can be charged to the mixer and can be prepared by any number of known methods, e.g., in a mixer or a container.

The charging of the solid elastomer, the wet filler, and the linking agent can occur all at once, or sequentially, and can occur in any sequence. The charging can comprise separate charges of the linking agent and the wet filler. Alternatively, the charging can comprise a mixture comprising the wet filler and linking agent. For example, (a) all solid elastomer added first, (b) all wet filler added first, (c) all solid elastomer added first with a portion of wet filler and linking agent followed by the addition of one or more remaining portions of wet filler and linking agent, (d) a portion of solid elastomer added and then a portion of wet filler and/or linking agent added, (e) at least a portion of the wet filler is added first followed by at least a portion of the solid elastomer and/or at least a portion of the linking agent, (f) at the same time or about the same time, a portion of solid elastomer, a portion of wet filler, and a portion of linking agent are added as separate charges to the mixer, or (g) at least a portion of solid elastomer and at least a portion of wet filler are added in any order and in one or more portions, mixing the at least a portion of solid elastomer and at least a portion of wet filler, charging the mixer with at least a portion of linking agent, and mixing the solid elastomer, wet filler, and linking agent to form the mixture. Other applicable methods of charging the mixer with the solid elastomer and wet filler are disclosed in PCT Publ. No. WO 2020/247663, the disclosure of which is incorporated by reference herein.

With regards to a mixture comprising the wet filler and linking agent, the mixture can be a particulate mixture of wet filler and linking agent, e.g., a powder. Where the linking agent is a liquid, it can be coated onto or otherwise combined with the wet filler by any number of methods known in the art, e.g., dipping, spraying, etc. If the linking agent is a solid, it can be coated onto or combined with the wet filler by solution or dispersion, e.g., aqueous solution or aqueous dispersion. The powder can be charged to the mixer as is, or can be formed into a pellet, i.e., a pellet that is a mixture comprising the linking agent. As another option, a solution or dispersion containing the linking agent can be combined with fluffy carbon black (and optionally silica and/or other filler types). In addition to the combining, the solution can also wet the carbon black (and optionally silica and/or other filler types) to form the wet filler. The resulting wet filler (e.g., that is or comprises wet carbon black) can then be fed to a pin pelletizer and pelletized via the methods disclosed herein.

The wet filler disclosed herein comprises carbon black. On a dry basis the filler comprises e.g., at least 50% carbon black, at least 60%, at least 70%, at least 80%, at least 90%, at least 95%, at least 99% carbon black by weight relative to the total weight of the filler, or substantially all of the filler is carbon black. The filler can comprise other filler types in addition to carbon black, i.e., at least one additional filler. The additional filler can be particulate or fibrous or plate-like. For example, a particulate filler is made of discrete bodies. Such fillers can often have an aspect ratio (e.g., length to diameter) of 3:1 or less, or 2:1 or less, or 1.5:1 or less. Fibrous fillers can have an aspect ratio of, e.g., 2:1 or more, 3:1 or more, 4:1 or more, or higher.

As an option, the at least one additional filler is selected from carbonaceous materials, carbon black, silica, nanocellulose, lignin, clays, nanoclays, metal oxides, metal carbonates, pyrolysis carbon, reclaimed carbon, recovered carbon black (e.g., as defined in ASTM D8178-19, rCB), graphenes, graphene oxides, reduced graphene oxide (e.g., reduced graphene oxide worms as disclosed in PCT Publ. No. WO 2019/070514A1, the disclosure of which is incorporated by reference herein), or densified reduced graphene oxide granules (as disclosed in U.S. Prov. Appl. No. 62/857,296, filed Jun. 5, 2019, and PCT Publ. No. 2020/247681, the disclosures of which are incorporated by reference herein), carbon nanotubes, single-wall carbon nanotubes, multi-wall carbon nanotubes, or combinations thereof, or corresponding coated materials (e.g., silicon-treated carbon black) or chemically-treated materials thereof (e.g., chemically-treated carbon black). Other suitable fillers include carbon nanostructures (CNSs, singular CNS), a plurality of carbon nanotubes (CNTs) that are crosslinked in a polymeric structure by being branched, e.g., in a dendrimeric fashion, interdigitated, entangled and/or sharing common walls with one another. CNS fillers are described in U.S. Pat. No. 9,447,259, and PCT Appl. No. PCT/US2021/027814, the disclosures of which are incorporated by reference herein. Blends of additional fillers can also be used, e.g., blends of silica and carbon black, silica and silicon-treated carbon black, and carbon black and silicon-treated carbon black. The filler can be chemically treated (e.g. chemically treated carbon black, chemically treated silica, silicon-treated carbon black) and/or chemically modified. The filler can be or include carbon black having an attached organic group(s). The filler can have one or more coatings present on the filler (e.g. silicon-coated materials, silica-coated material, carbon-coated material). The filler can be oxidized and/or have other surface treatments. There is no limitation with respect to the type of filler (e.g., silica, carbon black, or other filler) that can be used.

The additional filler can comprise a fibrous filler including natural fibers, semi-synthetic fibers, and/or synthetic fibers (e.g., nanosized carbon filaments), such as short fibers disclosed in PCT Publ. No. WO 2021/153643, the disclosure of which is incorporated by reference herein. Other fibrous fillers include poly(p-phenylene terephthalamide) pulp, commercially available as Kevlar® pulp (Du Pont).

Other suitable fillers include bio-sourced or bio-based materials (derived from biological sources), recycled materials, or other fillers considered to be renewable or sustainable include hydrothermal carbon (HTC, where the filler comprises lignin that has been treated by hydrothermal carbonization as described in U.S. Pat. Nos. 10,035,957, and 10,428,218, the disclosures of which are incorporated by reference, herein), rice husk silica, carbon from methane pyrolysis, engineered polysaccharide particles, starch, siliceous earth, crumb rubber, and functionalized crumb rubber. Exemplary engineered polysaccharides include those described in U.S. Pat. Publ. Nos. 2020/0181370 and 2020/0190270, the disclosures of which are incorporated herein by reference. For example, the polysaccharides can be selected from: poly alpha-1,3-glucan; poly alpha-1,3-1,6-glucan; a water insoluble alpha-(1,3-glucan) polymer having 90% or greater $\alpha$-1,3-glycosidic linkages, less than 1% by weight of alpha-1,3,6-glycosidic branch points, and a number average degree of polymerization in the range of from 55 to 10,000; dextran; a composition comprising a poly alpha-1,3-glucan ester compound; and water-insoluble cellulose having a weight-average degree of polymerization (DPw) of about 10 to about 1000 and a cellulose II crystal structure.

As an option, the filler of the wet filler can be or include a blend of carbon black and at least one additional filler (e.g., silica, silicon-treated carbon black, etc.) in any weight ratio so long as at least 50% of the filler (or at least 60%, at least 70%, at least 80%, at least 90%, at least 95%, at least 99%) of the filler by weight is carbon black on a dry basis. The wet filler can have a liquid present in an amount of from about 25 wt. % to about 75 wt. %, e.g., from about 30% to about 75%, from about 40% to about 75%, from about 45% to about 75%, from about 50% to about 75%, from about 30% to about 70%, from about 40% to about 70%, from about 45% to about 70%, from about 50% to about 70%, from about 30% to about 65%, from about 40% to about 65%, from about 45% to about 65%, from about 50% to about 65%, from about 30% to about 60% by weight, from about 40% to about 60%, from about 45% to about 60%, or from about 50% to about 60% by weight, based on the weight of the total wet filler. The at least one additional filler can be wetted such that the blend of fillers has a liquid content of at least 20% by weight based on the total weight of the wet filler, or any of the amounts disclosed herein.

In addition to the wet filler, as an option, the mixture can further include one or more non-wetted filler (e.g., any of the fillers that is not wetted as described herein, such as dry filler, such as a filler having no more than 10% liquid by weight.) When non-wetted filler is present, the total amount of filler can be such that at least 50% or at least 60%, at least 70%, at least 80%, at least 90%, at least 95% by weight of the total weight of filler is a wet filler, such as from 50% to 99%, from 60% to 99%, from 70% to 99%, from 80% to 99%, from 90% to 99%, or from 95% to 99% of the total amount of filler can be wet filler, with the balance of the filler being in a non-wetted state or not being considered a wet filler.

The amount of filler (e.g. wet filler alone or wet filler with other filler) that is loaded into the mixture can be targeted (on a dry weight basis) to be at least 20 phr, at least 30 phr, at least 40 phr, or range from 20 phr to 250 phr, from 20 phr to 200 phr, from 20 phr to 180 phr, from 20 phr to 150 phr, from 20 phr to 100 phr, from 20 phr to 90 phr, from 20 phr to 80 phr, 30 phr to 200 phr, from 30 phr to 180 phr, from 30 phr to 150 phr, from 30 phr to 100 phr, from 30 phr to 80 phr, from 30 phr to 70 phr, 40 phr to 200 phr, from 40 phr to 180 phr, from 40 phr to 150 phr, from 40 phr to 100 phr, from 40 phr to 80 phr, from 35 phr to 65 phr, or from 30 phr to 55 phr or other amounts within or outside of one or more of these ranges. The above phr amounts can also apply to filler dispersed in the elastomer (filler loading). Other filler types, blends, combinations, etc. can be used, such as those disclosed in are disclosed in PCT Publ. No. WO 2020/247663, the disclosure of which is incorporated by reference herein.

With regard to the solid elastomer that is used and mixed with the wet filler, the solid elastomer can be considered a dry elastomer or substantially dry elastomer. The solid elastomer can have a liquid content (e.g., solvent or water content) of 5 wt. % or less, based on the total weight of the solid elastomer, such as 4 wt. % or less, 3 wt. % or less, 2 wt. % or less, 1 wt. % or less, or from 0.1 wt. % to 5 wt. %, 0.5 wt. % to 5 wt. %, 1 wt. % to 5 wt. %, 0.5 wt. % to 4 wt. %, and the like. The solid elastomer (e.g., the starting solid elastomer) can be entirely elastomer (with the starting liquid, e.g., water, content of 5 wt. % or less) or can be an elastomer that also includes one or more fillers and/or other components. For instance, the solid elastomer can be from 50 wt. % to 99.9 wt. % elastomer with 0.1 wt. % to 50 wt. % filler predispersed in the elastomer in which the predispersed filler is in addition to the wet filler. Such elastomers can be prepared by dry mixing processes between non-wetted filler and solid elastomers. Alternatively, a composite made by mixing a wet filler and solid elastomer (e.g., according to the processes disclosed herein) can be used as the solid elastomer and further mixed with a wet filler according to the processes disclosed herein. However, the solid elastomer is not a composite, mixture or compound made by a liquid masterbatch process and is not any other pre-blended composite of filler dispersed in an elastomer while the elastomer is in a liquid state, e.g., a latex, suspension or solution.

Any solid elastomer can be used in the present methods. Exemplary elastomers include natural rubber (NR), functionalized natural rubber, synthetic elastomers such as styrene-butadiene rubber (SBR, e.g., solution SBR (SSBR), emulsion SBR (ESBR), or oil-extended SSBR (OESSB+R)), functionalized styrene-butadiene rubber, polybutadiene rubber (BR), functionalized polybutadiene rubber, polyisoprene rubber (IR), ethylene-propylene rubber (EPDM), isobutylene-based elastomers (e.g., butyl rubber), halogenated butyl rubber, polychloroprene rubber (CR), nitrile rubbers (NBR), hydrogenated nitrile rubber (HNBR), fluoroelastomers, perfluoroelastomers, and silicone rubber, e.g., natural rubber, and blends thereof, e.g., natural rubber, styrene-butadiene rubber, polybutadiene rubber, and blends thereof, e.g., a blend of first and second solid elastomers. Other synthetic polymers that can be used in the present methods (whether alone or as blends) include hydrogenated SBR, and thermoplastic block copolymers (e.g., such as those that are recyclable). Synthetic polymers include copolymers of ethylene, propylene, styrene, butadiene and isoprene. Other synthetic elastomers include those synthesized with metallocene chemistry in which the metal is selected from Ce, Pr, Nd, Sm, Gd, Tb, Dy, Ho, Tm, Yb, Lu, Co, Ni, and Ti. Polymers made from bio-based monomers can also be used, such as monomers containing modern carbon as defined by ASTM D6866, e.g., polymers made from bio-based styrene monomers disclosed in U.S. Pat. No. 9,868,853, the disclosure of which is incorporated by reference herein, or polymers made from bio-based monomers such as butadiene, isoprene, ethylene, propylene, farnesene, and comonomers thereof. If two or more elastomers are used, the two or more elastomers can be charged into the mixer as a blend at the same time (as one charge or two or more charges) or the elastomers can be added separately in any sequence and amount. For example, the solid elastomer can comprise natural rubber blended with one or more of the elastomers disclosed herein, e.g., butadiene rubber and/or styrene-butadiene rubber, or SBR blended with BR, etc. For instance, the additional solid elastomer can be added separately to the mixer and the natural rubber can be added separately to the mixer.

The solid elastomer can be or include natural rubber. If the solid elastomer is a blend, it can include at least 50 wt. % or at least 70 wt. % or at least 90 wt. % natural rubber. The blend can further comprise synthetic elastomers such as one or more of styrene-butadiene rubber, functionalized styrene-butadiene rubber, and polybutadiene rubber, and/or any other elastomers disclosed herein.

The natural rubber may also be chemically modified in some manner. For example, it may be treated to chemically or enzymatically modify or reduce various non-rubber components, or the rubber molecules themselves may be modified with various monomers or other chemical groups such as chlorine. Other examples include epoxidized natural rubber and natural rubber having a nitrogen content of at most 0.3 wt. %, as described in PCT Publ. No. WO 2017/207912.

Other exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene and the like.

Other applicable solid elastomers that can be used in the presently disclosed methods are disclosed in PCT Publ. No. WO 2020/247663, the disclosure of which is incorporated by reference herein.

With regard to the mixer that can be used in any of the methods disclosed herein, any suitable mixer can be utilized that is capable of combining (e.g., mixing together or compounding together) a filler with solid elastomer. The mixer(s) can be a batch mixer or a continuous mixer. A combination of mixers and processes can be utilized in any of the methods disclosed herein, and the mixers can be used sequentially, in tandem, and/or integrated with other processing equipment. The mixer can be an internal or closed mixer or an open mixer, or an extruder or a continuous compounder or a kneading mixer or a combination thereof. The mixer can be capable of incorporating filler and linking agent into solid elastomer and/or capable of dispersing the filler and linking agent in the elastomer and/or distributing the filler and linking agent in the elastomer.

The mixer can have one or more rotors (at least one rotor). The at least one rotor or the one or more rotors can be screw-type rotors, intermeshing rotors, tangential rotors, kneading rotor(s), rotors used for extruders, a roll mill that imparts significant total specific energy, or a creping mill. Generally, one or more rotors are utilized in the mixer, for example, the mixer can incorporate one rotor (e.g., a screw type rotor), two, four, six, eight, or more rotors. Sets of rotors can be positioned in parallel and/or in sequential orientation within a given mixer configuration.

With regard to mixing, the mixing can be performed in one or more mixing steps. Mixing commences when at least the solid elastomer and wet filler are charged to the mixer and energy is applied to a mixing system that drives one or more rotors of the mixer. The one or more mixing steps can occur after the charging step is completed or can overlap with the charging step for any length of time. For example, a portion of one or more of the solid elastomers and/or wet filler can be charged into the mixer before or after mixing commences. The mixer can then be charged with one or more additional portions of the solid elastomer and/or filler and/or linking agent. For batch mixing, the charging step is completed before the mixing step is completed.

As an option, control over mixer surface temperatures, by whichever mechanism(s), can provide an opportunity for longer mixing or residence times, which can result in improved filler dispersion and/or improved rubber-filler interactions and/or consistent mixing and/or efficient mixing, compared to mixing processes without temperature control of at least one mixer surface.

The temperature-control means can be, but is not limited to, the flow or circulation of a heat transfer fluid through channels in one or more parts of the mixer. For example, the heat transfer fluid can be water or heat transfer oil. For example, the heat transfer fluid can flow through the rotors, the mixing chamber walls, the ram, and the drop door. In other embodiments, the heat transfer fluid can flow in a jacket (e.g., a jacket having fluid flow means) or coils around one or more parts of the mixer. As another option, the temperature control means (e.g., supplying heat) can be electrical elements embedded in the mixer. The system to provide temperature-control means can further include means to measure either the temperature of the heat transfer fluid or the temperature of one or more parts of the mixer. The temperature measurements can be fed to systems used to control the heating and cooling of the heat transfer fluid. For example, the desired temperature of at least one surface of the mixer can be controlled by setting the temperature of the heat transfer fluid located within channels adjacent one or more parts of the mixer, e.g., walls, doors, rotors, etc.

The temperature of the at least one temperature-control means can be set and maintained, as an example, by one or more temperature control units ("TCU"). This set temperature, or TCU temperature, is also referred to herein as "$T_z$." In the case of temperature-control means incorporating heat transfer fluids, $T_z$ is an indication of the temperature of the fluid itself.

As an option, the temperature-control means can be set to a temperature, $T_z$, ranging from 30° C. to 150° C., from 40° C. to 150° C., from 50° C. to 150° C., or from 60° C. to 150° C., e.g., from 30° C. to 155° C., from 30° C. to 125° C., from 40° C. to 125° C., from 50° C. to 125° C., from 60° C. to 125° C., from 30° C. to 110° C., from 40° C. to 110° C., from 50° C. to 110° C., 60° C. to 110° C., from 30° C. to 100° C., from 40° C. to 100° C., from 50° C. to 100° C., 60° C. to 100° C., from 30° C. to 95° C., from 40° C. to 95° C., from 50° C. to 95° C., 50° C. to 95° C., from 30° C. to 90° C., from 40° C. to 90° C., from 50° C. to 90° C., from 65° C. to 95° C., from 60° C. to 90° C., from 70° C. to 110° C., from 70° C. to 100° C., from 70° C. to 95° C., 70° C. to 90° C., from 75° C. to 110° C., from 75° C. to 100° C., from 75° C. to 95° C., or from 75° C. to 90° C. Other ranges are possible with equipment available in the art.

Compared to dry mixing, under similar situations of filler type, elastomer type, and mixer type, the present processes can allow higher energy input. Controlled removal of the water from the mixture enables longer mixing times and consequently improves the dispersion of the filler. As described herein, the present process provides operating conditions that balance longer mixing times with evaporation or removal of water in a reasonable amount of time.

Other operating parameters to be considered include the maximum pressure that can be used. Pressure affects the temperature of the filler and rubber mixture. If the mixer is a batch mixer with a ram, the pressure inside the mixer chamber can be influenced by controlling the pressure applied to the ram cylinder.

As another option, rotor tip speeds can be optimized. The energy inputted into the mixing system is a function, at least in part, of the speed of the at least one rotor and rotor type. Tip speed, which takes into account rotor diameter and rotor speed, can be calculated according to the formula:

$$\text{Tip speed, m/s} = \pi \times (\text{rotor diameter, m}) \times (\text{rotational speed, rpm})/60.$$

As tip speeds can vary over the course of the mixing, as an option, the tip speed of at least 0.5 m/s or at least 0.6 m/s is achieved for at least 50% of the mixing time, e.g., at least 60%, at least 70%, at least 75%, at least 80%, at least 85%, at least 90%, at least 95%, or substantially all of the mixing time. The tip speed can be at least 0.6 m/s, at least 0.7 m/s, at least 0.8 m/s, at least 0.9 m/s, at least 1.0 m/s, at least 1.1 m/s, at least 1.2 m/s, at least 1.5 m/s or at least 2 m/s for at least 50% of the mixing time, or other portions of the mixing listed above. The tip speeds can be selected to minimize the mixing time, or can be from 0.6 m/s to 10 m/s, from 0.6 m/s to 8 m/s, from 0.6 to 6 m/s, from 0.6 m/s to 4 m/s, from 0.6 m/s to 3 m/s, from 0.6 m/s to 2 m/s, from 0.7 m/s to 4 m/s, from 0.7 m/s to 3 m/s, from 0.7 m/s to 2 m/s, from 0.7 m/s to 10 m/s, from 0.7 m/s to 8 m/s, from 0.7 to 6 m/s, from 1 m/s to 10 m/s, from 1 m/s to 8 m/s, from 1 m/s to 6 m/s, from 1 m/s to 4 m/s, from 1 m/s to 3 m/s, or from 1 m/s to 2 m/s, (e.g., for at least 50% of the mixing time or other mixing times described herein).

Any one or combination of commercial mixers with one or more rotors, temperature control means, and other components, and associated mixing methods to produce rubber compounds can be used in the present methods, such as those disclosed in PCT Publ. No. WO 2020/247663, the disclosure of which is incorporated by reference herein.

By "one or more mixing steps," it is understood that the steps disclosed herein may be a first mixing step followed by further mixing steps prior to discharging. The one or more mixing steps can be a single mixing step, e.g., a one-stage or single stage mixing step or process, in which the mixing is performed under one or more of the following conditions: at least one of the mixer temperatures are controlled by temperature controlled means with one or more rotors operating at a tips speed of at least 0.6 m/s for at least 50% of mixing time, and/or the at least one temperature-control means that is set to a temperature, $T_z$, of 65° C. or higher, and/or continuous mixing; each is described in further detail herein. In certain instances, in a single stage or single mixing step the composite can be discharged with a liquid content of no more than 10% by weight. In other embodiments, two or more mixing steps or mixing stages can be performed so long as one of the mixing steps is performed under one or more of the stated conditions.

As indicated, during the one or more mixing steps, in any of the methods disclosed herein, at least some liquid present in the mixture and/or wet filler introduced is removed at least in part by evaporation. As an option, the one or more mixing steps or stages can further remove a portion of the liquid from the mixture by expression, compaction, and/or wringing, or any combinations thereof. Alternatively, a portion of the liquid can be drained from the mixer after or while the composite is discharged.

During the mixing cycle, after much of the liquid has been released from the composite and the filler incorporated, the mixture experiences an increase in temperature. It is desired to avoid excessive temperature increases that would degrade the elastomer. Discharging, (e.g., "dumping" in batch mixing), can occur on the basis of time or temperature or specific energy or power parameters selected to minimize such degradation.

In any methods disclosed herein, the discharging step from the mixer occurs and results in a composite comprising the filler dispersed in the natural rubber at a total loading of at least 20 phr, e.g., from 20 to 250 phr, or other loadings disclosed herein. As an option, discharging occurs on the basis of a defined mixing time. The mixing time between the start of the mixing and discharging can be about 1 minute or more, such as from about 1 minute to 40 minutes, from about 1 minute to 30 minutes, from about 1 minute to 20 minutes, or from 1 minute to 15 minutes, or from 3 minutes to 30 minutes, from 5 minutes to 30 minutes, or from 5 minutes to 20 minutes, or from 5 minutes to 15 minutes, or from 1 minute to 12 minutes, or from 1 minute to 10 minutes or other times. Alternatively, for batch internal mixers, ram down time can be used as a parameter to monitor batch mixing times, e.g., the time that the mixer is operated with the ram in its lowermost position e.g., fully seated position or with ram deflection (as described in PCT Publ. No. WO 2020/247663, the disclosure of which is incorporated by reference herein). Ram down time can be less than 30 min., less than 15 min., less than 10 min., or ranges from 3 min. to 30 min or from 5 min. to 15 min, or from 5 min. to 10 min. As an option, discharging occurs on the basis of dump or discharge temperature. For example, the mixer can have a dump temperature ranging from 120° C. to 190° C., 130° C. to 180° C., such as from 140° C. to 180° C., from 150° C. to 180° C., from 130° C. to 170° C., from 140° C. to 170° C., from 150° C. to 170° C., or other temperatures within or outside of these ranges.

The methods further include discharging from the mixer the composite that is formed. The discharged composite can have a liquid content of no more than 10% by weight based on the total weight of the composite, as outlined in the following equation:

$$\text{Liquid content of composite }\%=100^*[\text{mass of liquid}]/[\text{mass of liquid}+\text{mass of dry composite}]$$

In any of the methods disclosed herein, the discharged composite can have a liquid content of no more than 10% by weight based on total weight of the composite, such as no more than 9%, no more than 8%, no more than 7%, no more than 6%, no more than 5%, no more than 2%, or no more than 1% by weight, based on the total weight of the composite. This amount can range from 0.1% to 10%, from 0.5% to 9%, 0.5% to 7%, from 0.5% to 5%, or from 0.5% to 3% by weight, based on the total weight of the composite discharged from the mixer at the end of the process. In any of the methods disclosed herein, the liquid content (e.g., "moisture content") can be the measured weight % of liquid present in the composite based on the total weight of the composite.

In any of the methods disclosed herein, liquid content in the composite can be the measured as weight % of liquid present in the composite based on the total weight of the composite. Any number of instruments are known in the art for measuring liquid (e.g., water) content in rubber materials, such as a coulometric Karl Fischer titration system, or a moisture balance, e.g., from Mettler (Toledo International, Inc., Columbus, OH).

In any of the methods disclosed herein, while the discharged composite can have a liquid content of 10% by weight or less, there optionally may be liquid (e.g., water) present in the mixer which is not held in the composite that is discharged. This excess liquid is not part of the composite and is not part of any liquid content calculated for the composite.

In any of the methods disclosed herein, the total liquid content (or total water content or total moisture content) of the material charged into the mixer is higher than the liquid content of the composite discharged at the end of the process. For instance, the liquid content of the composite discharged can be lower than the liquid content of the material charged into the mixer by an amount of from 10% to 99.9% (wt. % vs wt. %), from 10% to 95%, or from 10% to 50%.

Optionally the process further comprises adding the linking agent and optionally anti-degradants and during the charging or the mixing, i.e., during the one or more mixing steps. In any embodiment disclosed herein, as another option, after the mixing of at least the solid elastomer and wet filler has commenced and prior to the discharging step, the method can further include adding the linking agent and optionally at least one anti-degradant to the mixer so that the linking agent and the at least one anti-degradant is mixed in with the solid elastomer and wet filler. As an option, the mixture consists essentially of the solid elastomer and the wet filler; the mixture consists essentially of the solid elastomer, the wet filler, and the antidegradant; the composite consists essentially of the filler dispersed in the elastomer and the antidegradant; the composite consists of the filler dispersed in the elastomer; the composite consists of the filler dispersed in the elastomer and the antidegradant. As another option, the adding of the linking agent and antidegradant(s) can occur prior to the composite being formed and having a water content of 10 wt % or less, or 5 wt % or less.

The adding of the linking agent and optional adding of the anti-degradant(s) can occur at any time prior to the discharging step, e.g., before or after the mixer reaches an indicated mixer temperature of 120° C. or higher. This indicated mixer temperature can be measured by a temperature-measuring device within the mixing cavity. The indicated temperature of the mixer can be the same as or differ by 30° C. or less, or 20° C. or less, or 10° C. or less (or 5° C. or less or 3° C. or less or 2° C. or less) from the maximum temperature of the mixture or the composite achieved during the mixing stage (which can be determined by removing the composite from the mixer and inserting a thermocouple or other temperature measuring device into the composite). In this mixing method, as an option, the linking agent and optionally the antidegradant can be added to the mixer when the mixer reaches the temperature of 120° C. or higher. In other embodiments, the indicated temperature can range from 120° C. to 190° C., from 125° C. to 190° C., from 130° C. to 190° C., from 135° C. to 190° C., from 140° C. to 190° C., from 145° C. to 190° C., from 150° C. to 190° C., from 120° C. to 180° C., from 125° C. to 180° C., from 130° C. to 180° C., from 135° C. to 180° C., from 140° C. to 180° C., from 145° C. to 180° C., from 150° C. to 180° C., from 120° C. to 170° C., from 125° C. to 170° C., from 130° C. to 170° C., from 135° C. to 170° C., from 140° C. to 170° C., from 145° C. to 170° C., from 150° C. to 170° C., and the like.

Examples of an anti-degradant that can be introduced is N-(1,3-dimethylbutyl)-N'-phenyl-p-phenylenediamine (6PPD), and others are described in other sections herein. The anti-degradant can be introduced in an amount ranging from 1% to 5%, from 0.5% to 2%, or from 0% to 3% by weight based on the weight of the composite that is formed. Anti-degradants added during the charging step or the mixing step may help prevent elastomer degradation during the mixing; however, due to the presence of the water in the mixture, the rate of degradation of the elastomer is lower compared to dry mix processes and the addition of anti-degradant can be delayed.

After the composite is formed and discharged, the method can include the further optional step of mixing the composite with additional elastomer to form a composite comprising a blend of elastomers. The "additional elastomer" or second elastomer can be additional natural rubber or can be an elastomer that is not natural rubber such as any elastomer disclosed herein, e.g., synthetic elastomers (e.g. styrene butadiene rubbers (SBR such as SSBR, ESBR, etc.), polybutadiene (BR) and polyisoprene rubbers (IR), ethylene-propylene rubber (e.g., EPDM), isobutylene-based elastomers (e.g., butyl rubber), polychloroprene rubber (CR), nitrile rubbers (NBR), hydrogenated nitrile rubbers (HNBR), polysulfide rubbers, polyacrylate elastomers, fluoroelastomers, perfluoroelastomers, and silicone elastomers). Blends of two or more types of elastomers (blends of first and second elastomers), including blends of synthetic and natural rubbers or with two or more types of synthetic or natural rubber, may be used as well.

The mixer can be charged with two or more charges of different elastomer to form a composite blend. For example, the mixer can be charged with the never-dried natural rubber and at least one additional elastomer, where the at least one additional elastomer is also a coagulum or a solid elastomer (e.g., having less than 5% water). Alternatively, the mixer can be charged with an elastomer blend. As another option, the process can comprise mixing the discharged composite with additional elastomer to form the blend. The composite discharged (e.g., after single-stage or two or multi-stage mixing) can have a moisture content of no greater than 5%, 3%, 2% by weight relative to the weight of the composite when blending with one or more additional elastomers (e.g., a composite comprising carbon black and natural rubber can be blended with synthetic elastomers such as BR or SBR). Further, both elastomers and fillers (wet or dry, such as wet or dry carbon black and/or silica and/or silicon-treated carbon black) can be combined with the composite.

As another option, a composite comprising a filler (e.g., carbon black and/or silica) and an elastomer (e.g., natural rubber and/or SBR and/or BR) prepared according to the presently disclosed methods can be combined with a masterbatch containing natural rubber and/or synthetic polymers made by any method known in the art, such as by known dry mixing or solvent masterbatch processes. For example, silica/elastomer masterbatches can be prepared as described in U.S. Pat. Nos. 9,758,627 and 10,125,229, or masterbatches from neodymium-catalyzed polybutadienes as described in U.S. Pat. No. 9,758,646, the disclosures of which are incorporated by reference herein. The masterbatch can have a fibrous filler, such as poly(p-phenylene terephthalamide) pulp, as described in U.S. Pat. No. 6,068,922, the disclosure of which is incorporated by reference herein. Masterbatches can have fillers such as graphenes, graphene oxides, reduced graphene oxides, or densified reduced graphene oxide granules, carbon nanotubes, single-wall carbon nanotubes, multi-wall carbon nanotubes, and carbon nanostructures, in which masterbatches of the latter are disclosed in U.S. Pat. No. 9,447,259, and PCT Appl. No. PCT/US2021/027814, the disclosures of which are incorporated by reference herein. Other suitable masterbatches can include the composites prepared from mixing wet filler and solid elastomer, as described in PCT Publ. No. WO 2020/247663, the disclosures of which is incorporated by reference herein. For example, the masterbatch can have a filler such as carbon black and/or silica and an elastomer such as natural rubber and/or SBR and/or butadiene rubber. Commercially available masterbatches can also be used, e.g., commercially available masterbatches such as Emulsil™ silica/SBR masterbatch or Emulblack™ carbon black/SBR masterbatch (both available from Dynasol group).

Exemplary masterbatches comprising elastomer blends (whether the blend is formed from first or single stage mixing or formed from multi-stage mixing), include: blends of natural rubber with synthetic, bio-sourced, and/or functionalized elastomers (e.g., SSBR, ESBR, BR) where the filler can be selected from one or more of carbon black, silica, and silicon-treated carbon black.

In addition to the solid elastomer, wet filler, and linking agent, the mixer can be charged with one or more charges of at least one additional elastomer to form a composite blend. As another option, the process can comprise mixing the discharged composite with additional elastomer to form the blend. The at least one additional elastomer can be the same as the solid elastomer or different from the solid elastomer.

Alternatively, the composite when discharged may contain at least one additive selected from antidegradants and coupling agents (e.g., where the wet filler further comprises silica, or where dry silica is charged to the mixer), which can be added at any time during the charging or mixing.

The carbon black can be untreated carbon black or treated carbon black or a mixture thereof. The filler can be or include wet carbon black in the form of pellets, fluffy powder, granules, and/or agglomerates. Wet carbon black can be formed into pellets, granules, or agglomerates in, e.g., a pelletizer, a fluidized bed or other equipment to make the wet filler.

The wet carbon black can be one or more of the following:
- never-dried carbon black; and/or
- never-dried carbon black pellets; and/or
- dried carbon black pellets that have been rewetted, such as with water in a pelletizer; and/or
- dried carbon black pellets that have been ground and then rewetted with water in a pelletizer; and/or
- dried carbon black pellets combined with water; and/or
- fluffy powder, granules, or agglomerates combined with water.

In typical carbon black manufacturing, carbon black is initially prepared as dry, fine particulate (fluffy) material. The fluffy carbon black can be densified by a conventional pelletizing process, e.g., by combining the carbon black with a liquid such as adding water and feeding the mixture to a pin pelletizer. As an option, the liquid can be a solution or dispersion comprising the linking agent. Pin pelletizers are well known in the art and include the pin pelletizer described in U.S. Pat. No. 3,528,785. The resulting wet pellets are then heated under controlled temperature and time parameters to remove liquid from the pellets before further handling and shipping. In an alternative process, carbon black pellets can be manufactured by a process that omits a drying step. In such a process, pelletized carbon black contains process water of at least 20% by weight based on a total weight of wet carbon black, e.g., at least 30% by weight, or at least 40% by weight.

Alternatively, carbon black pellets that have been dried (such as commercially available carbon black pellets) can be rewetted in a pelletizer. The pellets can be granulated, ground, classified, and/or milled, e.g., in a jet mill. The resulting carbon black is in fluffy form and can be repelletized in a pelletizer or otherwise compressed or agglomerated in the presence of water to wet the carbon black. As an option, the carbon black can be repalletized in the pelletizer in the presence of a solution or dispersion comprising the linking agent. Alternatively, the fluffy carbon black can be compressed into other forms, e.g., in a brick form, with equipment known in the art. As another option, carbon black, such as the carbon black pellets or the fluffy carbon black can be wetted, e.g., by using a fluidized bed, sprayer, mixer, or rotating drum, and the like. Where the liquid is water, never-dried carbon black or carbon black that has been rewetted can achieve a water content ranging from 20% to 80%, from 30% to 70% by weight or other ranges, e.g., from 55% to 60% by weight, with respect to the total weight of the wet carbon black.

The carbon black can be a furnace black, a gas black, a thermal black, an acetylene black, or a lamp black, a plasma black, a recovered carbon black (e.g., as defined in ASTM D8178-19), or a carbon product containing silicon-containing species, and/or metal containing species and the like.

The carbon black used in any of the methods disclosed herein, and can be any grade of reinforcing carbon blacks and semi-reinforcing carbon blacks or other carbon blacks having statistical thickness surface area (STSA) such as ranging from 20 $m^2/g$ to 250 $m^2/g$ or higher. STSA (statistical thickness surface area) is determined based on ASTM Test Procedure D-5816 (measured by nitrogen adsorption). Examples of ASTM grade reinforcing grades are N110, N121, N134, N220, N231, N234, N299, N326, N330, N339, N347, N351, N358, and N375 carbon blacks. Examples of ASTM grade semi-reinforcing grades are N539, N550, N650, N660, N683, N762, N765, N774, N787, N990 carbon blacks and/or N990 grade thermal blacks.

The carbon black can have any statistical thickness surface area (STSA) such as ranging from 20 $m^2/g$ to 250 $m^2/g$ or higher. STSA (statistical thickness surface area) is determined based on ASTM Test Procedure D-5816 (measured by nitrogen adsorption). The carbon black can have a compressed oil absorption number (COAN) ranging from about 30 mL/100 g to about 150 mL/100 g. Compressed oil absorption number (COAN) is determined according to ASTM D3493. As an option, the carbon black can have a STSA ranging from 20 $m^2/g$ to 180 $m^2/g$, or from 60 $m^2/g$ to 150 $m^2/g$ with a COAN ranging from 40 mL/100 g to 115 mL/100 g or from 70 mL/100 g to 115 mL/100 g.

As stated, the carbon black can be a rubber black, and especially a reinforcing grade of carbon black or a semi-reinforcing grade of carbon black. Carbon blacks sold under the Regal®, Black Pearls®, Spheron®, Sterling®, Propel®, Endure®, and Vulcan® trademarks available from Cabot Corporation, the Raven®, Statex®, Furnex®, and Neotex® trademarks and the CD and HV lines available from Birla Carbon (formerly available from Columbian Chemicals), and the Corax®, Durax®, Ecorax®, and Purex® trademarks and the CK line available from Orion Engineered Carbons (formerly Evonik and Degussa Industries), and other fillers suitable for use in rubber or tire applications, may also be exploited for use with various implementations. Suitable chemically functionalized carbon blacks include those disclosed in WO 96/18688 and US2013/0165560, the disclosures of which are hereby incorporated by reference. Mixtures of any of these carbon blacks may be employed.

Any of the methods disclosed herein relates, in part, to methods of preparing a composite that involves at least two mixing steps or stages. These two (or more) mixing steps can be considered multi-step or multi-stage mixing with a first mixing step or stage and at least a second mixing step or stage. One or more of the multi-stage mixing processes can be batch, continuous, semi-continuous, and combinations thereof.

For multi-stage process, the methods for preparing the composite include the step of charging or introducing into a first mixer at least a) one or more solid elastomers, b) one or more fillers wherein at least one filler or a portion of at least one filler is wet filler as described herein (e.g. a wet filler that comprises a filler and a liquid present in an amount of at least 20% by weight based on the total weight of the wet filler), and optionally, c) the linking agent. The combining of the solid elastomer with wet filler and optionally the linking agent forms a mixture or composite during this mixing step(s), which can be considered as a first mixing step or stage. The method further includes mixing the mixture, in this first mixing step, to an extent that at least a portion of the liquid is removed by evaporation or an evaporation process that occurs during the mixing. This first mixing step (in one or more mixing steps) or stage is conducted using one or more of the processes described earlier that forms a composite with the understanding that, after completion of the first mixing, it is not necessary for the mixture discharged from the mixer after the first mixing step (e.g., a discharged mixture) to have a liquid content of no more than 10 wt. %. In other words, with the multi-stage process(es), the mixture resulting from the completion of the first mixing from the first mixer (or first mixing step) can have a liquid content above 10 wt. %, but does have a liquid content that is reduced (by wt. %) as compared to the liquid content of the combined solid elastomer and wet filler at the start of the first mixing step.

Before the first mixer or other mixer is used in the second mixing step, as a further option, there can be a standing time wherein the composite formed from the first mixing rests or cools or both in the first mixer or in another container or location (e.g., mixing, stopping, and then mixing further). For instance, this standing time can be such that the mixture obtains a material temperature (also referred to as probe temperature) of less than 180° C. before the further mixing step commences (e.g., a the discharged mixture can have a material temperature ranging from about 100° C. to about 180° C., of from about 70° C. to 179° C., or from about 100° C. to about 170° C., or from about 120° C. to about 160° C.). Or, the standing time before the further or second mixing step commences, can be from about 1 minute to 60 minutes or more. The material temperature can be obtained by a number of methods known in the art, e.g., by inserting a thermocouple or other temperature measuring device into the mixture or composite.

The method then includes mixing or further mixing the mixture in at least a second mixing step or stage utilizing the same mixer (i.e., the first mixer) and/or utilizing a second mixer(s) that is different from the first mixer. With a multi-stage mixing process, there is the option of charging the linking agent to either the first mixer, the second mixer, or both.

After the first mixing, the further mixing step(s) conducted for the multi-stage mixing can utilize any one or more of the mixing procedures or parameters or steps utilized in the first mixing step as described herein. Thus, in conducting the further mixing step or stage, the same or different mixer design and/or same or different operating parameters as for the first mixer can be used in the further mixing stage. The mixers and their options described earlier for the first mixing step and/or the operating parameters described earlier for the mixing step can be optionally used in the further or second mixing step (e.g. the mixing steps, as described herein, that include a tip speed of at least 0.5 m/s for at least 50% of the time or at least 0.6 m/s for at least 50% of the time, and/or a $T_z$ of 65° C. or higher, among other parameters disclosed herein or in PCT Publ. No. WO 2020/247663, the disclosure of which is incorporated by reference herein.

In the multi-stage processes, a second mixing step (second stage mix) can also comprise charging the mixer with other components in addition to the mixture discharged from the first mixing step. For example, where the linking agent is not charged to the first mixer, the linking agent can be charged to the second mixer, e.g., as a separate charge, or as a mixture (particulate mixture or co-pellet) with filler (wet or dry filler, same or different filler as charged to the first mixer). Additionally or alternatively, as an example, the method can comprise charging additional filler, such as dry filler, wet filler, or a blend thereof prior to or during the second mixing step. The additional filler can be the same or different from the filler already present in the mixture, e.g., any of the additional fillers disclosed herein. For example, the mixture discharged from the first mixer can be considered a masterbatch in which either all or a portion is combined with additional filler. For example, wet or dry carbon black, silica, silicon-treated carbon black (and blends thereof) can be added to the mixture discharged from the first mixing step, such as a mixture comprising carbon black and natural rubber.

For the multi-stage mixing process(es), in at least one option, at least a second mixer is used in the further mixing step(s). When this option is used, the second mixer can have the same or different design as the first mixer, and/or can have the same or one or more different operating parameters as the first mixer. Specific examples, not meant to be limiting, are provided below with respect to first mixer and second mixer options. For instance, the first mixer can be a tangential mixer or an intermesh mixer, and the second mixer can be a tangential mixer, an intermesh mixer, an extruder, a kneader, or a roll mill. For instance, the first mixer can be an internal mixer and the second mixer can be a kneader, a single screw extruder, a twin-screw extruder, a multiple-screw extruder, a continuous compounder, or a roll mill. For instance, the first mixer can be a first tangential mixer, and the second mixer can be a second (different) tangential mixer. For instance, the first mixer is operated with a ram, and the second mixer is operated without a ram. For instance, the second mixer is utilized and is operated at a fill factor of the mixture, on a dry weight basis, ranging from 25% to 70%, from 25% to 60%, from 25% to 50%, from 30% to 50%, or other fill factor amounts described herein.

As an option, the method includes mixing or further mixing the mixture in at least a second mixing step or stage utilizing the same mixer (i.e., the first mixer) and/or utilizing a second mixer(s) that is different from the first mixer. The mixing with the second mixer can be such that the second mixer or second mixing is operated at a ram pressure of 5 psi or less and/or with the ram raised to at least 75% of the ram's highest level (such as at least 85%, at least 90%, at least 95%, or at least 99% or 100% of the ram's highest level), and/or a ram operated in floating mode, and/or a ram positioned such that it does not substantially contact the mixture; and/or a ram-less mixer; and/or a fill factor of the mixture ranges from 25% to 70%. The method then includes discharging from the last used mixer the composite that is formed such that the composite has a liquid content of no more than 10% by weight based on the total weight of the composite. Methods for operating a second mixer that are suitable are described in PCT Publ. No. WO 2020/247663, the disclosure of which is incorporated by reference herein.

Additives can also be incorporated in the mixing and/or compounding steps (e.g., whether in a single-stage mix, or the second stage or third stage of a multi-stage mix) and can include anti-degradants, and one or more rubber chemicals to enable dispersion of filler into the elastomer. Rubber chemicals, as defined herein, include one or more of: processing aids (to provide ease in rubber mixing and processing, e.g. various oils and plasticizers, wax), activators (to activate the vulcanization process, e.g. zinc oxide and fatty acids), accelerators (to accelerate the vulcanization process, e.g. sulphenamides and thiazoles), vulcanizing agents (or curatives, to crosslink rubbers, e.g. sulfur, peroxides), and other rubber additives, such as, but not limit to, retarders, co-agents, peptizers, adhesion promoters (e.g., use of cobalt salts to promote adhesion of steel cord to rubber-based elastomers (e.g., as described in U.S. Pat. No. 5,221,559 and U.S. Pat. Publ. No. 2020/0361242, the disclosures of which are incorporated by reference herein), resins (e.g., tackifiers, traction resins) flame retardants, colorants, blowing agents, and additives to reduce heat build-up (HBU). As an option, the rubber chemicals can comprise processing aids and activators. As another option, the one or more other rubber chemicals are selected from zinc oxide, fatty acids, zinc salts of fatty acids, wax, accelerators, resins, and processing oil. Exemplary resins include those selected from one or more of C5 resins, C5-C9 resins, C9 resins, rosin resins, terpene resins, aromatic-modified terpene resins, dicyclopentadiene resins, alkylphenol resins, and resins disclosed in U.S. Pat.

Nos. 10,738,178, 10,745,545, and U.S. Pat. Publ. No. 2015/0283854, the disclosures of which are incorporated by reference herein.

In any method of producing a composite disclosed herein, the method can further include one or more of the following steps, after formation of the composite:

- one or more holding steps;
- one or more drying steps can be used to further dry the composite to obtain a dried composite;
- one or more extruding steps;
- one or more calendaring steps;
- one or more milling steps to obtain a milled composite;
- one or more granulating steps;
- one or more cutting steps;
- one or more baling steps to obtain a baled product or mixture;
- the baled mixture or product can be broken apart to form a granulated mixture; and/or
- one or more mixing or compounding steps; and/or
- one or more sheeting steps.

As a further example, the following sequence of steps can occur and each step can be repeated any number of times (with the same or different settings), after formation of the composite:

- one or more holding steps to develop further elasticity
- one or more cooling steps
- drying the composite further to obtain a further dried composite;
- mixing or compounding the composite to obtain a compounded mixture;
- milling the compounded mixture to obtain a milled mixture (e.g., roll milling);
- granulating the milled mixture;
- optionally baling the mixture after the granulating to obtain a baled mixture;
- optionally breaking apart the baled mixture and mixing.

In addition, or alternatively, the composite can be compounded with one or more antidegradants, zinc oxide, fatty acids, zinc salts of fatty acids, wax, accelerators, resins, processing oil, and/or curing agents, and vulcanized to form a vulcanizate. Such vulcanized compounds can have one or more improved properties, such as one or more improved rubber properties, such as, but not limited to, an improved hysteresis, wear resistance and/or rolling resistance, e.g., in tires, or improved mechanical and/or tensile strength, or an improved tan delta and/or an improved tensile stress ratio, and the like.

As an example, in a compounding step, the ingredients, with the exception of the sulfur or other cross-linking agent and accelerator, are combined with the neat composite in a mixing apparatus (the non-curatives and/or antidegradants, are often pre-mixed and collectively termed "smalls"). The most common mixing apparatus is the internal mixer, e.g., the Banbury or Brabender mixer, but other mixers, such as continuous mixers (e.g., extruders), may also be employed. Thereafter, in a latter or second compounding step, the cross-linking agent, e.g., sulfur, and accelerator (if necessary)(collectively termed curatives) are added. As another option, the compounding can comprise combining the composite with one or more of antidegradants, zinc oxide, fatty acids, zinc salts of fatty acids, wax, accelerators, resins, processing oil, and curing agents in a single compounding stage or step, e.g., the curatives can be added with smalls in the same compounding stage. The compounding step is frequently performed in the same type of apparatus as the mixing step but may be performed on a different type of mixer or extruder or on a roll mill. One of skill in the art will recognize that, once the curatives have been added, vulcanization will commence once the proper activation conditions for the cross-linking agent are achieved. Thus, where sulfur is used, the temperature during mixing is preferably maintained substantially below the cure temperature.

Also disclosed herein are methods of making a vulcanizate. The method can include the steps of at least curing a composite in the presence of at least one curing agent. Curing can be accomplished by applying heat, pressure, or both, as known in the art.

With respect to this vulcanizate, the vulcanizate can have one or more elastomeric properties. For instance, the vulcanizate can have a tensile stress ratio M300/M100 of at least 5.9, e, g., at least 6.0, at least 6.1, at least 6.2, as evaluated by ASTM D412, wherein M100 and M300 refer to the tensile stress at 100% and 300% elongation, respectively.

Alternatively or in addition, the vulcanizate can have a maximum tan δ (60° C.) of no greater than 0.22, e.g., no greater than 0.21, no greater than 0.2, no greater than 0.19, no greater than 0.18, e.g., no greater than 0.16, no greater than 0.15, no greater than 0.14, no greater than 0.13, no greater than 0.12, or no greater than 0.11.

The vulcanizates prepared from the present composites (e.g., those made by any of the presently disclosed processes of mixing wet filler, solid elastomer, and linking agent under the disclosed mixing conditions of $T_z$ or tip speed, whether single stage or multi-stage) can show improved properties. For example, vulcanizates prepared from the present composites can have improved properties over a vulcanizate prepared from a composite made by dry mixing solid elastomer, non-wetted filler, and linking agent ("dry mix composite"), particularly those dry mix composites having the same composition ("dry mix equivalent"). Thus, the comparison is made between dry mixes and the present mixing processes between comparable fillers, elastomers, filler loading (e.g., ±5 wt %, ±2 wt. %), and compound formulation (including linking agent), and optionally curing additives. Under these conditions, the vulcanizate has a tan δ value that is less than a tan δ value of a vulcanizate prepared from a dry mix composite having the same composition. In addition to or in the alternative, the vulcanizate has a tensile stress ratio, M300/M100, that is greater than a tensile stress ratio of a vulcanizate prepared from a dry mix composite having the same composition, wherein M100 and M300 refer to the tensile stress at 100% and 300% elongation, respectively.

Elastomers (e.g., diene-based elastomers) are known to degrade in the presence of air/oxygen. Degradation can take the form of scission and/or or crosslinking of polymer chains, which can affect rubber properties. Elastomer composites can be cured in the presence of curing agents, such as sulfur, to effect crosslinking, resulting in a vulcanizate that is hardened (with respect to the composite) and has greater stability with respect to degradation; degradation can still occur but to a lesser extent compared to uncured composites. However, there may be a need to store (and/or transport) uncured elastomer composites for long periods of time (e.g., 3, 6, 9 months, or up to 1 year or even up to 2 years). Moreover, the increased temperatures that are often present in warehouses or during transport (trucks, shipping containers) can accelerate the rate of degradation. To reduce this rate, composites can be stored in refrigerators or under air conditioning. Such storage solutions, however, require excessive energy expenditures and refrigeration equipment.

It has been discovered that composites containing the linking agent can exhibit reduced degradation over time, e.g., over at least 5 days, at least 1 week, at least 2 weeks, at least 1 month (at least 30 days), at least 2 months, at least 30 months, and even at least 6 months (at least 180 days) up to 1 year (12 months) or even up to 2 years at temperatures of at least 20° C. Such composites that have been stored or aged are referred to as "aged composites." As another option, aged composites can be those that have been stored or aged for at least 1 day at elevated temperatures. Degradation of the aged composites can be observed by monitoring rubber properties of the composite or vulcanizate. For example, vulcanizates prepared from composites made with the linking agent according to the presently disclosed processes have certain properties that are maintained over time. Aging the presently disclosed composites for time periods of a least 1 day, 5 days, etc., up to 1 year can result in enhanced hysteresis properties of vulcanizates prepared from the aged composites, as indicated by maximum tan δ, Payne Effect, and/or Payne Ratio values that are increased by no more than 10% the value of a vulcanizate prepared from a composite that was not aged, e.g., aged for no more than 2 days or no more than 1 day. For example, the rheological properties of the composite (and compounds formed from such composites) can be enhanced. One example of such a property is the Payne Effect of the vulcanizate, which can be indicated by the Payne ratio or Payne difference. Payne ratio, defined by G'(0.1%)/G'(50%), where G'(0.1%) is a dynamic storage modulus measured at 0.1% strain amplitude and G'(50%) is a dynamic storage modulus measured at 50% strain amplitude. Payne difference is the difference between G'(0.1%) and G'(50%).

At room temperature (e.g., 20° C.), aged composites can be stored or aged for at least 5 days or other time periods disclosed herein. The time period for aging can be determined from the day of manufacture (day 0). As an option, the aged composites are those that have been stored or aged at temperatures of at least 20° C., e.g., from 20° C. to 200° C. or under ambient conditions such as temperatures ranging from 20° C. to 40° C. or from 20° C. to 30° C., whether in a climate-controlled environment or in an area without climate control (e.g., warehouse, truck). The time period for aging can be at least 7 days, at least 2 weeks, at least 1 month, at least 3 months, at least 6 months, or at least 1 year or more, e.g., from 5 days to 2 years, from 5 days to 1 year, from 5 days to 6 months, from 5 days to 3 months, from 2 weeks to 1 year, from 2 weeks to 6 months, from 1 month to 1 year, from 1 month to 6 months, and other ranges.

As another option, aged composites can be stored or aged for at least 1 day at elevated temperatures, e.g., a temperature of at least 40° C., such as temperatures ranging from 40° C. to 200° C., from 40° C. to 180° C., from 40° C. to 150° C., from 40° C. to 120° C., from 40° C. to 100° C., from 40° C. to 90° C., from 40° C. to 75° C., from 50° C. to 200° C., from 50° C. to 180° C., from 50° C. to 150° C., from 50° C. to 120° C., from 50° C. to 100° C., from 50° C. to 90° C., from 50° C. to 75° C., from 60° C. to 200° C., from 60° C. to 180° C., from 60° C. to 150° C., from 60° C. to 120° C., from 60° C. to 100° C., or from 60° C. to 90° C. In certain embodiments, the composite can be stored at elevated temperatures for at least 7 days, at least 2 weeks, at least 3 weeks, or at least 1 month up to 6 months or up to 1 year. As an option, storage at elevated temperatures is performed for no longer than 1 month, no longer than 2 weeks, or no longer than 1 week, e.g., storage from 5 days to 1 month.

Also disclosed herein are articles made from or containing the composite or vulcanizates disclosed herein.

The composite may be used to produce an elastomer or rubber containing product. As an option, the elastomer composite may be used in or produced for use, e.g., to form a vulcanizate to be incorporated in various parts of a tire, for example, tire treads (such as on road or off-road tire treads), including cap and base, undertread, innerliners, tire sidewalls, tire carcasses, tire sidewall inserts, wire-skim for tires, and cushion gum for retread tires, in pneumatic tires as well as non-pneumatic or solid tires. Alternatively or in addition, elastomer composite (and subsequently vulcanizate) may be used for hoses, seals, gaskets, weather stripping, windshield wipers, automotive components, liners, pads, housings, wheel and track elements, tire sidewall inserts, wire-skim for tires, and cushion gum for retread tires, in pneumatic tires as well as non-pneumatic or solid tires. Alternatively or in addition, elastomer composite (and subsequently vulcanizate) may be used for hoses, seals, gaskets, anti-vibration articles, tracks, track pads for track-propelled equipment such as bulldozers, etc., engine mounts, earthquake stabilizers, mining equipment such as screens, mining equipment linings, conveyor belts, chute liners, slurry pump liners, mud pump components such as impellers, valve seats, valve bodies, piston hubs, piston rods, plungers, impellers for various applications such as mixing slurries and slurry pump impellers, grinding mill liners, cyclones and hydrocyclones, expansion joints, marine equipment such as linings for pumps (e.g., dredge pumps and outboard motor pumps), hoses (e.g., dredging hoses and outboard motor hoses), and other marine equipment, shaft seals for marine, oil, aerospace, and other applications, propeller shafts, linings for piping to convey, e.g., oil sands and/or tar sands, and other applications where abrasion resistance and/or enhanced dynamic properties are desired. Further the elastomer composite, via the vulcanized elastomer composite, may be used in rollers, cams, shafts, pipes, bushings for vehicles, or other applications where abrasion resistance and/or enhanced dynamic properties are desired.

Accordingly, articles include vehicle tire treads including cap and base, sidewalls, undertreads, innerliners, wire skim components, tire carcasses, engine mounts, bushings, conveyor belt, anti-vibration devices, weather stripping, windshield wipers, automotive components, seals, gaskets, hoses, liners, pads, housings, and wheel or track elements. For example, the article can be a multi-component tread, as disclosed in U.S. Pat. Nos. 9,713,541, 9,713,542, 9,718,313, and 10,308,073, the disclosures of which are incorporated herein by reference.

EXAMPLES

Mixing for Examples I and II and all compounding processes were performed with a BR-1600 Banbury® mixer ("BR1600"; Manufacturer: Farrell) with a ram pressure of 2.8 bar. The BR1600 mixer was operated with two 2-wing, tangential rotors (2WL), providing a capacity of 1.6 L. Mixing for Example III was performed with a BB-16 tangential mixer ("BB-16"; Kobelco Kobe Steel Group) fitted with two tangential 4-wing rotors (type 4WN), providing 16.2 L capacity.

Water content in the discharged composite was measured using a moisture balance (Model: HE53, Manufacturer: Mettler Toledo NA, Ohio). The composite was sliced into small pieces (size: length, width, height <5 mm) and 2 to 2.5 g of material was placed on a disposable aluminum disc/plate which was placed inside the moisture balance. Weight loss was recorded for 30 mins at 125° C. At the end of 30 mins, moisture content for the composite was recorded as:

$$\text{moisture content of composite} = \left(\frac{\text{initial weight} - \text{final weight}}{\text{initial weight}}\right) * 100.$$

The following tests were used to measure rubber properties on each of the vulcanizates:

- Tensile stress at 100% elongation (M100) and tensile stress at 300% elongation (M300) were evaluated by ASTM D412 (Test Method A, Die C) at 23° C., 50% relative humidity and at crosshead speed of 500 mm/min. Extensometers were used to measure tensile strain. The ratio of M300/M100 is referred to as tensile stress ratio (or modulus ratio).
- Max tan δ was measured with an ARES-G2 rheometer (Manufacturer: TA Instruments) using 8 mm diameter parallel plate geometry in torsional mode. The vulcanizate specimen diameter size was 8 mm diameter and about 2 mm in thickness. The rheometer was operated at a constant temperature of 60° C. and at constant frequency of 10 Hz. Strain sweeps were run from 0.1-68% strain amplitude. Measurements were taken at ten points per decade and the maximum measured tan δ ("max tan δ") was recorded, also referred to as "tan δ" unless specified otherwise. The Payne ratio was calculated from the ratio of dynamic storage modulus G' at 0.1% strain to G' at 50% strain, i.e., G'(0.1%)/G' (50%).

Example I

This Example describes the preparation of composites and corresponding vulcanizates, in which solid elastomer was mixed with wet filler and a linking agent.

All samples were prepared with ASTM grade N234 carbon black, provided as VULCAN® 7H carbon black ("V7H"; Cabot Corporation). The wet carbon black pellets had a moisture content of 55.2% and were prepared by milling with an 8" model MicroJet mill to generate fluffy carbon black particles having a 99.5% particle size diameter less than 10 microns. This fluffy carbon black was then wetted with the pin pelletizer to regenerate the wetted pellets. The elastomer used was standard grade SMR5 natural rubber (Hokson Rubber, Malaysia). Technical descriptions of this natural rubber are widely available, such as in Rubber World Magazine's Blue Book published by Lippincott and Peto, Inc. (Akron, Ohio, USA). The linking agent used was sodium (2Z)-4-[(4-aminophenyl)amino]-4-oxo-2-butenoate, commercially available as Sumilink® 200 coupling agent ("S200"; Sumitomo Chemical).

Two examples were prepared where the linking agent was added in the same mixing stage as the wet carbon black. The following comparatives were prepared: conventionally mixed natural rubber and carbon black (Dry 1), conventionally mixed natural rubber, carbon black, and S200 (Dry 2).

The formulations are shown in Table 1. Carbon black loading was targeted on a dry basis.

TABLE 1

| Formulations | Dry 1 | Dry 2 | Ex. 1 | Ex. 2 |
|---|---|---|---|---|
| Stage 1 Formulation | | | | |
| SMR5 | 100 | 100 | 100 | 100 |
| V7H | 50 | 50 | | |
| V7H wet | | | 50 | 50 |
| S200 | 0 | 2 | 2 | 2 |
| 6PPD | 2 | 2 | 2 | 2 |
| Stage 2 Formulation | | | | |
| TMQ | 1.5 | 1.5 | 1.5 | 1.5 |
| zinc oxide | 3 | 3 | 3 | 3 |
| stearic acid | 2 | 2 | 2 | 2 |
| wax beads | 1.5 | 1.5 | 1.5 | 1.5 |
| 6PPD | 0.5 | 0.5 | 0.5 | 0.5 |
| Stage 3 Formulation | | | | |
| BBTS | 1.4 | 1.4 | 1.4 | 1.4 |
| Sulfur | 1.2 | 1.2 | 1.2 | 1.2 |

6PPD=N-(1,3-dimethylbutyl)-N'-phenyl-p-phenylenediamine. The wax beads were Akrowax™ 5031 wax beads, and BBTS (N-tert-butyl-2 benzothiazole sulfenamide) was Accelerator BBTS, all available from Akrochem, Akron, Ohio.

First stage mixing protocols are outlined in Table 2 (dry mixing) and Table 3 (mixing with wet filler). The time intervals listed in the mixing methods below refer to the time period from the start of the mixing, defined as "0 s." For Ex. 1, the linking agent was added at a temperature of 140° C. and for Ex. 2, the linking agent was added at 210 s of total mixing time.

TABLE 2

Dry 1 and Dry 2: TCU temp = 50° C.; 80 rpm; FF = 70%

| Time (s) or Temp (° C.) | Description |
|---|---|
| 0 s | Add NR |
| 30 s | Add 2/3 V7H |
| 150 s | Sweep/add remaining V7H |
| 180 s | Sweep |
| 140° C. | Add 6PPD (and add S200 for Dry 2) |
| 145° C. | Sweep/Scrape |
| 160° C. | Dump |

TABLE 3

TCU temp = 90° C.; 105 rpm; FF = 70%

| Time (s) or Temp (° C.) | Ex. 1 Description | Ex. 2 Description |
|---|---|---|
| 0 | Add NR | Add NR |
| 30 | Add 3/4 CB | Add 3/4 CB |
| 150 s or 125° C. | Sweep/Add Remaining CB | Sweep/Add Remaining CB |
| 180 s | Sweep | Sweep |
| 210 s | | Add S200 |
| 140° C | Add 6PPD and S200 | Add 6PPD |
| 145° C. | Sweep/Scrape | Sweep/Scrape |
| 160° C. | Dump | Dump |

All composites were sheeted on a 2-roll mill operated at 50° C. and about 37 rpm, followed by six pass-throughs with a nip gap about 5 mm. The moisture contents for both Ex. 1 and Ex. 2 composites after stage 1 mixing, relative to the weight of the composite, were 0.8% and 0.9%, respectively.

Vulcanizates were formed by compounding the composites with the stage 2 formulation according to the protocol of Table 4, followed by compounding with curing agents (stage 3 formulation) according to the protocol of Table 5. After each compounding stage, the compounds were sheeted on a 2-roll mill operated at 50° C. and about 37 rpm, followed by six pass-throughs with a nip gap about 5 mm. The final compounds were sheeted to 2.4 mm thickness on a 2-roll mill operated at 60° C. The final compounds were cured in a heated press (2500 lbs) at 150° C. for 30 min.

TABLE 4

| TCU Temp = 50° C.; 80 rpm; FF = 68% | |
|---|---|
| Time (s) | Description |
| 0 | Add 1st stage composite |
| 30 | Add stage 2 formulation ingredients |
| 90 | Sweep |
| 150 | Dump, adjust rpm <125° C. |

TABLE 5

| TCU Temp = 60° C.; 80 rpm; FF = 65% | |
|---|---|
| Time (s) | Description |
| 0 | Add 2nd stage composite and curatives |
| 30 | Sweep |
| 90 | Dump |

Vulcanizate properties are shown in Table 6.

TABLE 6

| | Dry 1 | Dry 2 | Ex. 1 | Ex. 2 |
|---|---|---|---|---|
| M100 (MPa) | 2.89 | 2.91 | 2.51 | 2.51 |
| M300 (MPa) | 15.53 | 16.47 | 15.67 | 15.46 |
| M300/M100 | 5.38 | 5.65 | 6.24 | 6.15 |
| Max tan δ (60° C.) | 0.174 | 0.144 | 0.140 | 0.131 |

The data of Table 6 shows that the dynamic hysteresis loss Max tan δ of composites mixed with wet filler and the linking agent was lower than that of the comparative Dry 1 and Dry 2 examples. The tensile stress ratio, M300/M100, of Ex. 1 and Ex. 2 higher than that of the dry mix examples. This demonstrates that improved rubber properties can be achieved by a combination of mixing with wet filler and the use of a linking agent.

Example II

This Example describes the preparation of composites and corresponding vulcanizates, in which solid elastomer was mixed with wet filler that had been co-pelletized with a linking agent.

Three linking agents were evaluated: cystamine dihydrochloride ("cystamine"; 96%, Sigma-Aldrich), hexamethylene-1,6-bis(thiosulfate ("Duralink"; Duralink™ HTS tire additive, Eastman Chemical Co.), and thiourea (Sigma-Aldrich). All samples were prepared with ASTM grade N234 carbon black, provided as VULCAN® 7H carbon black ("V7H"; Cabot Corporation). The elastomer used was standard grade SMR20 natural rubber (Hokson Rubber, Malaysia). Technical descriptions of this natural rubber are widely available, such as in Rubber World Magazine's Blue Book published by Lippincott and Peto, Inc. (Akron, Ohio, USA).

Co-pellets containing the linking agents and carbon black (wet or dry) were charged to the mixer. The co-pellets of linking agent and carbon black were formed by combining a solution of 6 g (of linking agent with DI water (310 g) and 250 g of fluffy V7H carbon black that had been prepared as in Example I. Pelletization was performed with a 10 HP Heated Pin Pelletizer for a residence time of 5 minutes at 60° C. For Ex. 3, Ex. 4, and Ex. 5, the resulting wet pellets were used without drying. For examples Dry 3, Dry 4, and Dry 5, the resulting wet pellets were dried in an oven at 125° C. overnight before mixing. For comparative example Dry 6, pellets containing carbon black and no linking agent were prepared as described in this Example.

Formulations are shown in Table 7.

TABLE 7

| Formulation | Dry 6 | Dry 3 | Ex. 3 | Dry 4 | Ex. 4 | Dry 5 | Ex. 5 |
|---|---|---|---|---|---|---|---|
| Stage 1 Formulation | | | | | | | |
| SMR 20 | 100 | 100 | 100 | 100 | 100 | 100 | 100 |
| N234 V7H | 50 | | | | | | |
| Cystamine + V7H co-pellet, dry | | 51.2 | | | | | |
| Cystamine + V7H co-pellet, wet | | | 51.2 | | | | |
| Duralink + V7H co-pellet, dry | | | | 51.2 | | | |
| Duralink + V7H co-pellet, wet | | | | | 51.2 | | |
| Thiourea + V7H co-pellet, dry | | | | | | 51.2 | |
| Thiourea + V7H co-pellet, wet | | | | | | | 51.2 |
| 6PPD | 1 | 1 | 1 | 1 | 1 | 1 | 1 |
| Stage 2 Formulation (or "smalls" for dry pellets) | | | | | | | |
| TMQ | 0 | 0 | 0 | 0 | 0 | 0 | 0 |
| zinc oxide | 3 | 3 | 3 | 3 | 3 | 3 | 3 |
| stearic acid | 2 | 2 | 2 | 2 | 2 | 2 | 2 |
| wax beads | 0 | 0 | 0 | 0 | 0 | 0 | 0 |
| 6PPD | 0 | 0 | 0 | 0 | 0 | 0 | 0 |
| CBS | 1.2 | 1.2 | 1.2 | 1.2 | 1.2 | 1.2 | 1.2 |
| Sulfur | 1.2 | 1.2 | 1.2 | 1.2 | 1.2 | 1.2 | 1.2 |

6PPD=N-(1,3-dimethylbutyl)-N'-phenyl-p-phenylenediamine. The wax beads were Akrowax™ 5031 wax beads, and CBS is N-cyclohexyl-2-benzothiazole sulfenamide, all available from Akrochem, Akron, Ohio.

Mixing protocols are shown in Table 8 for all mixes with dry filler (i.e., Dry 6 and Dry 3 to Dry 5).

TABLE 8

| TCU temp = 50° C.; 80 rpm; FF = 70% | |
|---|---|
| Time (s) | Description |
| 0 | Add SMR20 |
| 30 | Add filler |
| 60 | Sweep |
| 150 | Add smalls |
| 180 | Sweep |
| 240 | Dump |

Protocols for mixing with wet co-pellets Ex. 3, Ex. 4, and Ex. 5 are shown in Table 9.

TABLE 9

| TCU temp = 90° C.; 105 rpm; FF = 70% | |
|---|---|
| Time or Temp | Description |
| 0 s | Add SMR20 |
| 30 s | Add 3/4 co-pellets |
| 150 s or 125° C. | Sweep/Add remaining co-pellets |
| 180 s | Sweep |
| 140° C. | Add 6PPD |
| 145° C. | Sweep/Scrape |
| 160° C. | Dump |

The moisture contents for Ex. 3, Ex. 4, and Ex. 5 composites after stage 1 mixing were 0.74%, 0.35%, and 0.55%, respectively, relative to the weight of the composite. All composites were subjected to a second compounding stage (protocol of Table 10) where the curatives and smalls (for the composites from wet co-pellets; curatives only for dry mixed composites) were added.

TABLE 10

| TCU temp = 60° C.; 60 rpm; FF = 65% | |
|---|---|
| Time (s) | Description |
| 0 | Add stage 1 composite and Stage 2 Formulation |
| 30 | Sweep |
| 90 | Dump |

The compounds were sheeted on a 2-roll mill operated at 50° C. and about 37 rpm, banded for 1 minute, followed by four pass-throughs with a nip gap about 5 mm. The compounds were sheeted to 2.4 mm thickness on a 2-roll mill operated at 60° C. Final compounds were cured in a heated press for 21 min at a temperature of 150° C. (2500 lbs). Vulcanizate properties are shown in Table 11.

TABLE 11

| Sample | Dry 6 | Dry 3 | Ex. 3 | Dry 4 | Ex. 4 | Dry 5 | Ex. 5 |
|---|---|---|---|---|---|---|---|
| M100 (MPa) | 2.69 | 3.07 | 2.86 | 3.03 | 2.91 | 3.35 | 2.90 |
| M300 (MPa) | 14.64 | 16.35 | 17.23 | 16.11 | 17.67 | 17.88 | 17.68 |
| M300/M100 | 5.44 | 5.33 | 6.02 | 5.32 | 6.08 | 5.34 | 6.09 |
| tan δ max (60° C.) | 0.183 | 0.138 | 0.137 | 0.140 | 0.130 | 0.101 | 0.121 |

From the data of Table 11, it can be seen that vulcanizates of composites prepared from the wet co-pellets with linking agents showed either lower max tan δ, higher tensile stress ratio (M300/M100) or both, compared to the corresponding comparative dry-mixed example. Vulcanizates of Ex. 3, Ex. 4 and Ex. 5 all showed both lower max tan δ and higher tensile stress ratio than the comparative example Dry 6.

Example III

This Example describes the preparation of a composite by mixing wet filler with natural rubber and a linking agent, and an evaluation of composite properties as well as properties of the compound prepared from the composite.

All samples were prepared with ASTM grade N234 carbon black, provided as VULCAN® 7H carbon black ("V7H"; Cabot Corporation). The wet carbon black pellets had a moisture content of 56% and were prepared by milling with an 8" model MicroJet mill to generate fluffy carbon black particles having a 99.5% particle size diameter less than 10 μm. This fluffy carbon black was then wetted with the pin pelletizer to regenerate the wetted pellets. The elastomer used was standard grade RSS3 natural rubber (Von Bundit Co. Ltd., Thailand). Technical descriptions of this natural rubber are widely available, such as in Rubber World Magazine's Blue Book published by Lippincott and Peto, Inc. (Akron, Ohio, USA). The linking agent used was sodium (2Z)-4-[(4-aminophenyl)amino]-4-oxo-2-butenoate, commercially available as Sumilink® 200 coupling agent ("S200"; Sumitomo Chemical).

The mixing of wet carbon black with natural rubber was performed as a two-stage mix followed by a two-stage compounding. The formulations used are shown in Table 12. Carbon black loading was targeted on a dry basis.

TABLE 12

| Formulations | (phr) |
|---|---|
| Stage 1 Formulation | |
| RSS3 | 100 |
| V7H wet | 50 |
| S200 | 2 |
| 6PPD | 2 |
| Stage 3 Formulation | |
| TMQ | 1.5 |
| zinc oxide | 3 |
| stearic acid | 2 |
| wax beads | 1.5 |
| 6PPD | 0.5 |
| Stage 4 Formulation | |
| BBTS | 1.4 |
| Sulfur | 1.2 |

The two-stage mixing protocol is outlined in Table 13 ($1^{st}$ stage) and Table 14 ($2^{nd}$ stage). The time intervals listed in the mixing methods below refer to the step time. All mixes were performed under the following conditions: TCU temperature=90° C., fill factor=66%, ram pressure=112 barg. First stage mixing was conducted on the BB-16 mixer fitted with 4WN rotors (16.2 L capacity) with a ram pressure of 112 barg and is outlined in the protocol of table 13. After the first stage mix, the composite was processed in a TSR-125 twin-screw discharge extruder fitted with stationary knives (Kobelco Kobe Steel Group)

Second stage mixing was conducted on the BB-16 mixer fitted with 6WI rotors (14.4 L capacity) following the protocol of Table 13. The mixing was performed with the ram raised to its highest position. After initial mastication, mixing was performed under PID control (proportional integral differential), which allows automated control of the batch temperature via a feedback loop. A thermocouple inserted through the mixer drop door measures the batch temperature, which is transmitted to a PID controller. The output of the controller is used to control the speed of the mixer rotors. Second stage mixing conditions were: TCU temperature=65° C.; fill factor=35%; mixing time=582 s;

TABLE 13

| Time or Temp | rotor speed (rpm) | Description |
|---|---|---|
| 20 s | 50 | feed rubber to mixer |
| 110° C. | 60 | masticate rubber until 110° C. |
| 20 s | 60 | add 1st filler addition (75%) |
| 120 s or 130° C. | 85 | mix until earliest of 120 secs and 130 C. |
| 20 s | 60 | add S200 followed by $2^{nd}$ filler addition |
| 20 s | 60 | mix at 60 rpm for 20 secs, to allow hydraulic system to reach pressure |
| 155° C. | 85 | mix until 6PPD addition temperature (155° C.) |
| 20 s | 60 | Add 6PPD. |
| 160° C. | 85 | mix until dump temperature (160° C.) |
| 30 s | 50 | discharge after 30 s |

TABLE 14

| rotor speed (rpm) | Time or Temp | Mixing Protocol Description |
|---|---|---|
| 35 | 20 s | add composite to the mixer |
| 35 | 90 s | masticate with ram raised for 90 s |
| (variable) | 35-54 s | Masticate under PID temperature control with ram raised. Batch temperature automatically controlled via PID control, using a set point of 135° C. |
| | 30 | discharge mixer & close drop door after 30 s |

The moisture content of the composite after $1^{st}$ stage mixing was 4.96%; moisture content after 2nd stage mixing was 0.51%. The second stage composite was processed in a TSR-125 twin-screw discharger extruder fitted with a roller die (Kobelco Kobe Steel Group). The resulting sheet was cooled under ambient air.

The composites were stored in air for 30 days or 180 days. After the storage period, vulcanizates were formed by compounding the composites with the stage 3 formulation according to the protocol of Table 15, followed by compounding with curing agents (stage 4 formulation) according to the protocol of Table 16. After each compounding stage, the composites were sheeted on a 2-roll mill operated at 50° C. and about 37 rpm, followed by six pass-throughs with a nip gap about 5 mm. The final compounds were sheeted to 2.4 mm thickness on a 2-roll mill operated at 60° C. The final compounds were cured in a heated press (2500 lbs) at 150° C. for 30 min.

TABLE 15

TCU Temp = 50° C.; 80 rpm; FF = 68%

| Time (s) | Description |
|---|---|
| 0 | add composite |
| 30 | add stage 2 formulation ingredients |
| 90 | sweep |
| 150 | dump at 150 s |

TABLE 16

TCU Temp = 60° C.; 80 rpm; FF = 65%

| Time (s) | Description |
|---|---|
| 0 | add 1/2 $2^{nd}$ stage composite/add stage 3 formulation (curatives)/remaining composite |
| 30 | sweep |
| 90 | dump |

Properties of the vulcanizates prepared from two samples each of the 30 day-aged (Ex. 6 and Ex. 7) and 180 day-aged (Ex. 8 and Ex. 9) composite samples are shown in Table 17.

TABLE 17

| | Ex. 6 | Ex. 7 | Ex. 8 | Ex. 9 |
|---|---|---|---|---|
| Storage time (days) | 30 | 30 | 180 | 180 |
| Max tan δ (60° C.) | 0.14 | 0.14 | 0.14 | 0.14 |
| G' (0.1%) (MPa), compound | 4.7 | 5.1 | 4.4 | 4.5 |
| G' (50%) (MPa), compound | 1.82 | 1.85 | 1.69 | 1.64 |
| Payne ratio, compound | 2.59 | 2.78 | 2.62 | 2.74 |

As can be seen from the data of Table 17, the properties of the vulcanizate prepared from aged composites, which contain the linking agent, are surprisingly similar whether the composite was stored for 30 days (Ex. 6, Ex. 7) or 180 days (Ex. 8, Ex. 9). Even more surprisingly, the maximum tan δ values are unchanged for all the vulcanizates. These data show that the linking agent can assist in reducing the degradation of the composite performance over time, e.g., at least up to 180 days.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A method of preparing a composite, comprising:

(a) charging a mixer with at least a solid elastomer, a wet filler comprising carbon black and a liquid present in an amount ranging from 20% to 80% by weight based on total weight of wet filler, and a linking agent, wherein:

the wet filler is in the form of a powder, paste, pellet, or cake, the solid elastomer has a liquid content of 5 wt. % or less, and the charging comprises charging the mixer with separate charges of the linking agent and the wet filler;

(b) in one or more mixing steps, mixing the at least the solid elastomer, the wet filler, and the linking agent to form a mixture, and removing at least a portion of the liquid from the mixture by evaporation; and (c) discharging, from the mixer, the composite comprising the filler dispersed in the elastomer at a loading of at least 20 phr, wherein the composite has a liquid content of no more than 10% by weight based on total weight of said composite, wherein the linking agent is selected from compounds having at least two functional groups, wherein:

a first functional group is selected from —$N(R^1)(R^2)$, —$N(R^1)(R^2)(R^3)^+A^-$, —S—$SO_3M^1$, and structures represented by formula (I) and formula (II), (I)

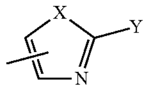

(II)

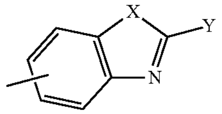

wherein A is chloride, bromide, iodide, hydroxyl, nitrate or acetate, X═NH, O, or S, Y═H, $OR^4$, $NR^4R^5$, —$S_nR^4$, and n is an integer selected from 1-6, and a second functional group is selected from thiocarbonyl, nitrile oxide, nitrone, nitrile imine, —S—$SO_3M^2$, —$S_x$—$R^6$, —SH, —$C(R^6)$═$C(R^7)$—$C(O)R^8$, —$C(R^6)$═$C(R^7)$—$CO_2R^8$, —$C(R^6)$═$C(R^7)$—$CO_2M^2$, and $R^1$-$R^8$ are each independently selected from H and $C_1$-$C_8$ alkyl; $M^1$ and $M^2$ are each independently selected from H, $Na^+$, $K^+$, $Li^+$, $N(R')_4^+$ wherein each R' is independently selected from H and $C_1$-$C_{20}$ alkyl, and x is an integer selected from 1-8.

2. The method of claim 1, wherein the linking agent further comprises at least one spacer between the first and second functional groups, wherein the at least one spacer is selected from —$(CH_2)_n$—, —$(CH_2)_yC(O)$—, —$C(R^9)$═$C(R^{10})$—, —C(O)—, —$N(R^9)$—, and —$C_6H_4$—, wherein $R^9$ and $R^{10}$ are each independently selected from H and $C_1$-$C_8$ alkyl and y is an integer selected from 1-10.

3. The method of claim 1, wherein the linking agent is selected from thiourea, cystamine, and compounds of formula (1), formula (2), and formula (3), $$H_2N—Ar—N(H)—C(O)—C(R^6)═C(R^7)—CO_2M^2 \quad (1)$$

$$H_2N—(CH_2)_n—SSO_3M^2 \quad (2)$$

$$M^1O_3S—S—(CH_2)_n—S—SO_3M^2. \quad (3)$$

4. The method of claim 3, wherein $M^1$ and $M^2$ are each independently selected from H, $Na^+$, and $N(R')_4^+$ and $R^6$ and $R^7$ are independently selected from Hand $C_1$-$C_6$ alkyl.

5. The method of claim 4, wherein the linking agent is selected from compounds of formula (1) and $R^6$ and $R^7$ are each H.

6. The method of claim 1, wherein the linking agent is sodium (2Z)-4-[(4-aminophenyl)amino]-4-oxo-2-butenoate.

7. The method of claim 1, wherein the charging comprises multiple additions of the solid elastomer, the wet filler, and/or the linking agent.

8. The method of claim 1, wherein said mixing is performed in one mixing step.

9. The method of claim 1, wherein said mixing is performed in two or more mixing steps.

10. The method of claim 9, wherein the mixing in (b) is a second mixing step, wherein a first mixing step comprises mixing at least a portion of the solid elastomer and at least a portion of the wet filler followed by charging the mixer with the linking agent.

11. The method of claim 1, wherein the charging in (a) comprises charging the mixer with a mixture comprising the linking agent and the wet filler.

12. The method of claim 1, wherein the charging in (a) comprises charging the mixer with a co-pellet comprising the linking agent and the wet filler.

13. The method of claim 1, wherein in at least one of the mixing steps, the method comprises conducting said mixing wherein the mixer has at least one temperature-control means that is set to a temperature, $T_z$, of 65° C. or higher.

14. The method of claim 1, wherein in at least one of the mixing steps, the method comprises conducting said mixing with one or more rotors of the mixer operating at a tip speed of at least 0.6 m/s for at least 50% of mixing time.

15. The method of claim 1, wherein a resulting total specific energy for the mixing is at least 1,300 kJ/kg composite.

16. The method of claim 1, wherein the wet filler further comprises at least one material selected from carbonaceous materials, silica, nanocellulose, lignin, clays, nanoclays, metal oxides, metal carbonates, pyrolysis carbon, graphenes, graphene oxides, reduced graphene oxide, carbon nanotubes, single-wall carbon nanotubes, multi-wall carbon nanotubes, or combinations thereof, and coated and treated materials thereof.

17. The method of claim 1, wherein the wet filler further comprises silica.

18. The method of claim 1, wherein the solid elastomer is selected from natural rubber, functionalized natural rubber, styrene-butadiene rubber, functionalized styrene-butadiene rubber, polybutadiene rubber, functionalized polybutadiene rubber, polyisoprene rubber, ethylene-propylene rubber, isobutylene-based elastomers, polychloroprene rubber, nitrile rubber, hydrogenated nitrile rubber, polysulfide rubber, polyacrylate elastomers, fluoroelastomers, perfluoroelastomers, silicone elastomers, and blends thereof.

19. The method of claim 1, wherein the solid elastomer is selected from natural rubber, functionalized natural rubber, styrene-butadiene rubber, functionalized styrene-butadiene rubber, polybutadiene rubber, functionalized polybutadiene rubber, and blends thereof.

20. The method of claim 1, wherein the one or more mixing steps is a continuous process.

21. The method of claim 1, wherein the one or more mixing steps is a batch process.

22. A method of preparing a composite, comprising:

(a) charging a first mixer with at least a solid elastomer and a wet filler comprising carbon black and a liquid present in an amount ranging from 20% to 80% by weight based on total weight of wet filler, wherein the wet filler is in the form of a powder, paste, pellet, or cake and the solid elastomer has a liquid content of 5 wt. % or less;

(b) in one or more mixing steps, mixing the at least the solid elastomer and the wet filler to form a mixture, and removing at least a portion of the liquid from the mixture by evaporation;

(c) discharging, from the first mixer, the mixture comprising the filler dispersed in the elastomer at a loading of at least 20 phr, wherein the mixture has a liquid content that is reduced to an amount less than the liquid content at the beginning of step (b), and wherein the mixture has a material temperature ranging from 100° C. to 180° C.;

(d) mixing the mixture from (c) in a second mixer to obtain the composite; and (e) discharging, from the second mixer, the composite having a liquid content of less than 3% by weight based on total weight of said composite, wherein a linking agent is charged to the second mixer, the linking agent being selected from compounds having at least two functional groups, wherein a first functional group is selected from —$N(R^1)(R^2)$, —$N(R^1)(R^2)(R^3)^+A^-$, —S—$SO_3M^1$, and structures represented by formula (I) and formula (II), (I)

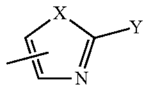

(II)

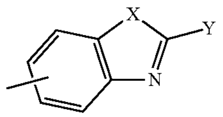

wherein $A^-$ is chloride, bromide, iodide, hydroxyl, nitrate or acetate, X═NH, O, or S, Y=H, $OR^4$, $NR^4R^5$, —$S_nR^4$, and n is an integer selected from 1-6, and a second functional group is selected from thiocarbonyl, nitrile oxide, nitrone, nitrile imine, —S—$SO_3M^2$, —$S_x$—$R^6$, —SH, —$C(R^6)$═$C(R^7)$—$C(O)R^8$, —$C(R^6)$═$C(R^7)$—$CO_2R^8$, —$C(R^6)$═$C(R^7)$—$CO_2M^2$, and $R^1$-$R^8$ are each independently selected from H and $C_1$-$C_8$ alkyl; $M^1$ and $M^2$ are each independently selected from H, $Na^+$, $K^+$, $Li^+$, $N(R')_4^+$ wherein each R' is independently selected from H and $C_1$-$C_{20}$ alkyl, and x is an integer selected from 1-8.

23. The method of claim 22, wherein the linking agent is charged to the first mixer and step (b) comprises mixing the at least the solid elastomer, the wet filler, and the linking agent to form the mixture.

24. The method of claim 22, wherein the linking agent is charged to the second mixer and step (d) comprises mixing the mixture from (c) and the linking agent in the second mixer to obtain the composite.

25. The method of claim 22, wherein the first and second mixers are the same.

26. The method of claim 22, wherein the first and second mixers are different.

27. The method of claim 22, wherein the second mixer is operated under at least one of the following conditions:

(i) a ram pressure of 5 psi or less;

(ii) a ram raised to at least 75% of its highest level;

(iii) a ram operated in floating mode;

(iv) a ram positioned such that it does not substantially contact the mixture;

(v) the mixer is ram-less; and (vi) a fill factor of the mixture ranges from 25% to 70%.

28. A method of preparing a vulcanizate, comprising:

curing the composite prepared by the method of claim 1 in the presence of at least one curing agent to form the vulcanizate.

29. The method of claim 1, further comprising aging the composite to form an aged composite.

30. The method of claim 29, wherein the composite was aged for at least 5 days at a temperature of at least 20° C.

31. The method of claim 29, wherein the composite was aged for at least 1 day at a temperature of at least 40° C.

32. The method of claim 29, wherein a vulcanizate prepared from the aged composite has a maximum tan δ is that is increased by no more than 10% the value of a vulcanizate prepared from a composite that was not aged.

33. The method of claim 29, wherein a vulcanizate prepared from the aged composite has a Payne effect is that is increased by no more than 10% the value of a vulcanizate prepared from a composite that was not aged.

34. An article comprising the vulcanizate prepared by the method of claim 28.

* * * * *